(12) United States Patent
Dawson et al.

(10) Patent No.: US 6,772,838 B2
(45) Date of Patent: Aug. 10, 2004

(54) LIGHTWEIGHT PARTICULATE MATERIALS AND USES THEREFOR

(75) Inventors: Jeffrey C. Dawson, Spring, TX (US); Allan R. Rickards, Pinehurst, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 10/113,844

(22) Filed: Apr. 1, 2002

(65) Prior Publication Data

US 2003/0102128 A1 Jun. 5, 2003

Related U.S. Application Data

(63) Continuation-in-part of application No. 09/579,147, filed on May 25, 2000, now Pat. No. 6,364,018, and a continuation-in-part of application No. 09/579,146, filed on May 25, 2000, and a continuation-in-part of application No. 09/519,238, filed on Mar. 6, 2000, now Pat. No. 6,330,916, which is a continuation-in-part of application No. 09/085,416, filed on May 27, 1998, now Pat. No. 6,059,034, which is a continuation-in-part of application No. 08/756,414, filed on Nov. 27, 1996, now abandoned.

(30) Foreign Application Priority Data

Nov. 21, 1997 (DK) .............................................. 1333/97

(51) Int. Cl.$^7$ ............................................. E21B 43/26
(52) U.S. Cl. ...................... 166/280; 166/310; 507/924
(58) Field of Search ................................ 166/278, 280, 166/308, 310, 276, 281; 501/128; 507/903, 924, 269

(56) References Cited

U.S. PATENT DOCUMENTS

| | | | |
|---|---|---|---|
| 3,089,542 A | 5/1963 | Kolodny | 166/42 |
| 3,155,159 A | 11/1964 | McGuire et al. | 166/29 |
| 3,254,064 A | 5/1966 | Nevins | 260/87.7 |
| 3,335,796 A | 8/1967 | Parker | |
| 3,341,501 A | 9/1967 | Hedrick et al. | 260/78 |

(List continued on next page.)

FOREIGN PATENT DOCUMENTS

| | | |
|---|---|---|
| CA | 2401023 | 8/2002 |
| DE | 19723661 | 12/1997 |
| EP | 00771935 A1 | 5/1997 |
| EP | 0879935 A2 | 10/1997 |
| EP | 0853186 A2 | 7/1998 |

(List continued on next page.)

OTHER PUBLICATIONS

Foreign Search Report dated Mar. 3, 1998 for GB Application No. 9725153.2.
International Search Report dated Oct. 13, 1998 for PCT/US98/10735.
Ward, "Industrial Utilization of $C_{21}$ Dicarboxylic Acid," Journal of the American Oil Chemists' Society, vol. 52, pp. 219–224 (Sep. 1974).
Brochure, "Functional Products Group Coatings & Ink Division," Henkel.
Co–Pending U.S. application Ser. No. 09/579,146 filed May 25, 2000.

(List continued on next page.)

Primary Examiner—Frank Tsay
(74) Attorney, Agent, or Firm—O'Keefe, Egan & Peterman, LLP

(57) ABSTRACT

Methods and compositions useful for sand control and/or hydraulic fracturing of subterranean formations that utilize relatively lightweight and/or substantially neutrally buoyant particles as particulate sand control or proppant material. Particles that may be employed include particulates of naturally-occurring materials that may be optionally strengthened or hardened by exposure to a modifying agent. Effectiveness of a modifying agent may be optionally enhanced by facilitating interaction between a modifying agent and one or more components present in a naturally occurring material by using enhancing agents and/or by using conditions that enhance interaction.

64 Claims, 5 Drawing Sheets

U.S. PATENT DOCUMENTS

| | | | |
|---|---|---|---|
| 3,363,690 A | 1/1968 | Fischer | 166/33 |
| 3,387,888 A | 6/1968 | Shock | 299/4 |
| 3,457,323 A | 7/1969 | Stengle | 260/826 |
| 3,481,401 A | 12/1969 | Graham | 166/280 |
| 3,492,147 A | 1/1970 | Young et al. | |
| 3,498,872 A | 3/1970 | Sterman et al. | 161/93 |
| 3,659,651 A | 5/1972 | Graham | 166/280 |
| 3,677,941 A | 7/1972 | Mazzara | 252/8.55 R |
| 3,772,353 A | 11/1973 | Joy | 260/448.2 N |
| 3,798,186 A | 3/1974 | Nakade et al. | 260/2.5 A |
| 3,888,311 A | 6/1975 | Cooke, Jr. | 166/280 |
| 3,917,345 A | 11/1975 | Davidson | 299/5 |
| 3,929,191 A | 12/1975 | Graham et al. | 166/276 |
| 3,998,744 A | 12/1976 | Arnold | 252/8.55 R |
| 4,013,474 A | 3/1977 | Teitell et al. | 106/2 |
| 4,049,866 A | 9/1977 | Lane et al. | 428/402 |
| 4,113,691 A | 9/1978 | Ward | 260/37 |
| 4,137,182 A | 1/1979 | Golinkin | 252/8.55 |
| 4,193,453 A | 3/1980 | Golinkin | 166/295 |
| 4,301,215 A | 11/1981 | Deubzer et al. | 428/447 |
| 4,336,145 A | 6/1982 | Briscoe | |
| 4,374,692 A | 2/1983 | Siimeghy | 156/244.11 |
| 4,427,068 A | 1/1984 | Fitzgibbon | 166/280 |
| 4,466,890 A | 8/1984 | Briscoe | |
| 4,518,039 A | 5/1985 | Graham et al. | 166/276 |
| 4,522,731 A | 6/1985 | Lunghofer | 252/8.55 R |
| 4,527,627 A | 7/1985 | Graham et al. | 166/280 |
| 4,531,594 A | 7/1985 | Cowan | 175/72 |
| 4,606,388 A | 8/1986 | Favot | 144/361 |
| 4,649,065 A | 3/1987 | Hein et al. | 427/370 |
| 4,664,619 A | 5/1987 | Johnson et al. | 431/154 |
| 4,664,819 A | 5/1987 | Glaze et al. | 252/8.551 |
| 4,675,367 A | 6/1987 | Policastro et al. | 525/474 |
| 4,732,817 A | 3/1988 | Lotz et al. | 428/541 |
| 4,733,729 A | 3/1988 | Copeland | 166/276 |
| 4,741,971 A | 5/1988 | Beck et al. | 428/537 |
| 4,779,680 A | 10/1988 | Sydansk | 166/300 |
| 4,783,221 A | 11/1988 | Grove | 106/18.22 |
| 4,869,960 A | 9/1989 | Gibb et al. | 428/405 |
| 4,913,824 A | 4/1990 | Kneller | 210/701 |
| 4,913,972 A | 4/1990 | Grunewalder et al. | 428/425.5 |
| 4,969,523 A | 11/1990 | Martine et al. | 166/278 |
| 5,180,020 A | 1/1993 | Fuh | 175/72 |
| 5,188,175 A | 2/1993 | Sweet | 166/280 |
| 5,207,282 A | 5/1993 | Fuh | 175/72 |
| 5,243,010 A | 9/1993 | Choi et al. | 528/28 |
| 5,251,697 A | 10/1993 | Shuler | 166/268 |
| 5,330,005 A | 7/1994 | Card et al. | 166/280 |
| 5,360,631 A | 11/1994 | Strauss | 427/154 |
| 5,381,864 A | 1/1995 | Nguyen et al. | 166/280 |
| 5,420,174 A | 5/1995 | Dewprashad | |
| 5,422,183 A | 6/1995 | Sinclair et al. | 428/403 |
| 5,439,055 A | 8/1995 | Card et al. | 166/280 |
| 5,439,059 A | 8/1995 | Harris et al. | 166/300 |
| 5,447,197 A | 9/1995 | Rae et al. | |
| 5,473,041 A | 12/1995 | Itoh | 528/26 |
| 5,492,178 A | 2/1996 | Nguyen et al. | 166/276 |
| 5,501,274 A | 3/1996 | Nguyen et al. | 166/276 |
| 5,501,275 A | 3/1996 | Card et al. | 166/280 |
| 5,531,274 A | 7/1996 | Bienvenu, Jr. | 166/280 |
| 5,538,547 A | 7/1996 | Gerhardinger et al. | 106/2 |
| 5,540,759 A | 7/1996 | Golden et al. | 95/138 |
| 5,547,506 A | 8/1996 | Rae et al. | |
| 5,556,832 A | 9/1996 | Van Slyke | 507/203 |
| 5,604,186 A | 2/1997 | Hunt et al. | 507/204 |
| 5,652,026 A | 7/1997 | Saka et al. | 427/387 |
| 5,696,058 A | 12/1997 | Van Slyke | 507/263 |
| 5,697,440 A | 12/1997 | Weaver et al. | 166/281 |
| 5,710,111 A | 1/1998 | Van Slyke | 507/137 |
| 5,775,425 A | 7/1998 | Weaver et al. | 166/276 |
| 5,787,986 A | 8/1998 | Weaver et al. | 166/280 |
| 5,833,000 A | 11/1998 | Weaver et al. | 166/276 |
| 5,837,656 A | 11/1998 | Sinclair et al. | |
| 5,839,510 A | 11/1998 | Weaver et al. | 166/276 |
| 5,853,048 A | 12/1998 | Weaver et al. | |
| 5,871,049 A | 2/1999 | Weaver et al. | |
| 5,944,938 A | 8/1999 | Winerowd et al. | 156/315 |
| 5,955,144 A | 9/1999 | Sinclair et al. | |
| 5,960,878 A | 10/1999 | Nguyen et al. | |
| 5,964,295 A | 10/1999 | Brown et al. | 166/308 |
| 5,985,372 A | 11/1999 | Saka et al. | 427/387 |
| 6,016,869 A | 1/2000 | Burts, Jr. | 166/295 |
| 6,016,870 A | 1/2000 | Dewprashad et al. | 166/295 |
| 6,047,772 A | 4/2000 | Weaver et al. | 166/276 |
| 6,059,034 A | 5/2000 | Rickards et al. | 166/280 |
| 6,173,778 B1 | 1/2001 | Rae et al. | |
| 6,209,643 B1 | 4/2001 | Nguyen et al. | |
| 6,210,790 B1 | 4/2001 | Crivello | 428/325 |
| 6,330,916 B1 | 12/2001 | Rickards et al. | 166/280 |
| 6,364,018 B1 | 4/2002 | Brannon et al. | 166/280 |
| 6,399,719 B1 | 6/2002 | Dopico et al. | 525/498 |
| 6,416,621 B1 | 7/2002 | Karstens | 162/22 |
| 6,439,309 B1 | 8/2002 | Matherly et al. | 166/276 |
| 2002/0110644 A1 | 8/2002 | Kelsoe | 427/397 |
| 2002/0176995 A1 | 11/2002 | Nicholas et al. | 428/423.3 |

FOREIGN PATENT DOCUMENTS

| | | |
|---|---|---|
| EP | 0933498 A1 | 8/1999 |
| EP | 1001133 A1 | 5/2000 |
| GB | 994377 | 3/1962 |
| GB | 1108358 | 4/1968 |
| GB | 2225364 | 11/1989 |
| GB | 2319796 | 11/1997 |
| GB | 2354236 | 3/2001 |
| GB | 2360534 | 9/2001 |
| JP | 06228163 | 8/1994 |
| WO | 99604464 A1 | 7/1995 |
| WO | 98/54234 | 5/1998 |
| WO | 99/27229 | 5/1998 |
| WO | WO 01/23154 | 4/2001 |
| WO | 01/66908 | 9/2001 |
| WO | WO 01/93685 | 12/2001 |

OTHER PUBLICATIONS

Search Report dated Aug. 11, 1999 for Dutch Patent Application No. 1007616.

Martin, "Fracturing Recommendation" for Conoco State A29#8, BJ Services, Feb. 4, 5, 1999.

Treatment Report for Conoco State A29#8, Feb. 11, 1999.

Invoice for treatment of Conoco State A29#8, Feb. 11, 1999.

BJ Services, "FlexSand™ Proppant Pack Enhancement Additive" Ad, Mar. 2000 Issue of *Journal of Petroleum Technology*.

Dow, "The Dow Family of Ethyleneamine Products," 2 pages.

Westvaco, Product Data Bulletin, Westvaco DTC–275 (Dec. 1991).

Westvaco, Product Data Bulletin, Westvaco DTC–295 (Dec. 1991).

Westvaco, Product Data Bulletin, Westvaco DTC–155 (Dec. 1991).

Westvaco, Product Data Bulletin, Westvaco DIACID 1550 dicarboxylic acid (Dec. 1991).

Westvaco, Product Data Bulletin, Westvaco DTC–195 (Jul. 1987).

Westvaco, Product Data Bulletin, Westvaco DTC–298 (Dec. 1991).

Westvaco, Product Data Bulletin, TENAX 2010 Maleated Tall Oil Fatty Acid (Oct. 1992).

Air Products, "Specialty Chemicals From Air Products," 2 pages (1991).

International Search Report dated Oct. 19, 2001 for PCT/US01/07011.

International Search Report dated Oct. 19, 2001 for PCT/US01/07013.

Kirk–Othmer "Encyclopedia of Chemical Technology" *John Wiley & Sons*, Third Edition, vol. 16, pp. 248–273.

Crompton Corporation—Search Results, Nov. 5, 2001, Feb. 25, 2002.

Brochue, "ISOPAC Low–Density Gravel Substitute," Dowell Schlumberger.

Mai, C. and Militz, H., "Modification of wood with silicon compounds", Cost E22 Meeting, Tuusula, Finland, Institute Wood Biology and Wood Technology—University of Gottingen.

Van Vlack, Lawrence H. (The University of Michigan), "Elements Of Materials Science And Engineering," Copyright 1975, 1964, 1959, Third Edition; pp. 470–471.

"Santrol Overview—History and Development of Resin Coated Proppants," Printed from Internet Apr. 23, 2003, (http://www.fairmountminerals.com/SANTROL/SANTROL%20Web%20Site/Overview4.htm).

"Santrol Tempered TF," Printed from Internet Apr. 25, 2003, (http://www.fairmountminerals.com/SANTROL/SANTROL%20Web%20Site/TP_Tempered . . . ).

"Santrol Tempered LC," Printed from Internet Apr. 25, 2003, (http://www.fairmountminerals.com/SANTROL/SANTROL%20Web%20Site/TP_Tempered . . . ).

"Santrol Tempered DC," Printed from Internet Apr. 25, 2003, (http://www.fairmountminerals.com/SANTROL/SANTROL%20Web%20Site/TP_Tempered . . . ).

"Santrol Tempered HS," Printed from Internet Apr. 25, 2003 (http://www.fairmountminerals.com/SANTROL/SANTROL%20Web%20Site/TP_Tempered . . . ).

"kristalliner Quarz / crystalline quartz," Printed from Internet Apr. 25, 2003 (http://www.lure.u–psud.fr/Experiences/SACO/SA5/Communs/sio2.htm).

"Silica glass [$SiO_2$]," Printed from Internet Apr. 25, 2003 (http://www.allmeasures.com/Formulae/static/formulae/youngs_modulus/157.htm).

"Dennis Dawson Co., Walnut and Pecan Nut Shell Media," Printed from Internet Apr. 25, 2003 (http://www.dennisdawson.com/walnut.htm).

"Materials 100B—Discussion Questions #3," Printed from Internet, Apr. 2003.

Text Printed from Internet, Apr. 2003.

Brochure Entitled "Liquid Stone™ Cementing," BJ Services, 1995.

International Search Report dated Jul. 13, 2003 for GG 0306892.1; 1 pg. (foreign counterpart to the above–captioned U.S. patent application Ser. No. 10/113,844 (BJSC:297)).

LIGHTWEIGHT PARTICULATE MATERIALS AND USES THEREFOR

The present application is a continuation-in-part of U.S. patent application Ser. No. 09/579,147, filed May 25, 2000, now U.S. Pat. No. 6,364,018, and U.S. patent application Ser. No. 09/579,146, filed May 25, 2000; each of the foregoing applications being a continuation-in-part of U.S. patent application Ser. No. 09/519,238, filed Mar. 6, 2000, which issued as U.S. Pat. No. 6,330,916; which is a continuation-in-part of U.S. patent application Ser. No. 09/085,416, filed May 27, 1998, which issued as U.S. Pat. No. 6,059,034; which is a continuation-in-part of U.S. patent application Ser. No. 08/756,414, filed Nov. 27, 1996, now abandoned, and which also claims priority to Danish patent application S/N 1333/97 filed Nov. 21, 1997; the entire disclosures of each of the foregoing applications being incorporated herein by reference.

BACKGROUND OF THE INVENTION

1. Field of the Invention

This invention relates generally to methods and compositions useful for subterranean formation treatments, such as hydraulic fracturing treatments and sand control. In particular, this invention relates to use of relatively lightweight and/or substantially neutrally buoyant particles as proppant material in hydraulic fracturing treatments and as particulate material in sand control methods such as gravel packing, frac pack treatments, etc.

2. Description of the Related Art

Hydraulic fracturing is a common stimulation technique used to enhance production of fluids from subterranean formations. In a typical hydraulic fracturing treatment, fracturing treatment fluid containing a solid proppant material is injected into the formation at a pressure sufficiently high enough to cause the formation or enlargement of fractures in the reservoir. During a typical fracturing treatment, proppant material is deposited in a fracture, where it remains after the treatment is completed. After deposition, the proppant material serves to hold the fracture open, thereby enhancing the ability of fluids to migrate from the formation to the well bore through the fracture. Because fractured well productivity depends on the ability of a fracture to conduct fluids from a formation to a wellbore, fracture conductivity is an important parameter in determining the degree of success of a hydraulic fracturing treatment.

Hydraulic fracturing treatments commonly employ proppant materials that are placed downhole with a gelled carrier fluid (e.g., aqueous-based fluid such as gelled brine). Gelling agents for proppant carrier fluids may provide a source of proppant pack and/or formation damage, and settling of proppant may interfere with proper placement downhole. Formation damage may also be caused by gelled carrier fluids used to place particulates downhole for purposes such as for sand control, e.g., gravel packs, frac packs, etc. Formulation of gelled carrier fluids usually requires equipment and mixing steps designed for this purpose.

SUMMARY OF THE INVENTION

In the disclosed method, the application of relatively lightweight and/or substantially neutrally buoyant particulate material as a fracture proppant particulate advantageously may provide for substantially improved overall system performance in hydraulic fracturing applications, or in other well treating applications such as sand control. By "relatively lightweight" it is meant that a particulate has a density that is substantially less than a conventional particulate material employed in hydraulic fracturing or sand control operations, e.g., sand or having a density similar to these materials. By "substantially neutrally buoyant", it is meant that a particulate has a density sufficiently close to the density of a selected ungelled or weakly gelled carrier fluid (e.g., ungelled or weakly gelled completion brine, other aqueous-based fluid, slick water, or other suitable fluid) to allow pumping and satisfactory placement of the proppant/particulate using the selected ungelled or weakly gelled carrier fluid. For example, urethane resin-coated ground walnut hulls having a specific gravity of from about 1.25 to about 1.35 grams/cubic centimeter may be employed as a substantially neutrally buoyant proppant/particulate in completion brine having a density of about 1.2. It will be understood that these values are exemplary only. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid.

Advantageously, in one embodiment use of substantially neutral buoyant particulate material may eliminate the need for gellation of carrier fluid, thus eliminating a source of potential proppant pack and/or formation damage. Furthermore, a relatively lightweight particulate material may be easier to place within a targeted zone due to lessened settling constraints, and a reduced mass of such relatively lightweight particulate material is generally required to fill an equivalent volume than is required with conventional sand control particulates, used, for example, for gravel packing purposes. Elimination of the need to formulate a complex suspension gel may mean a reduction in tubing friction pressures, particularly in coiled tubing and in the amount of on-location mixing equipment and/or mixing time requirements, as well as reduced costs. Furthermore, when treated to have sufficient strength (e.g., by substantially filling the permeable porosity of a porous particle with resin or hardener), the disclosed relatively lightweight proppant/particles may be employed to simplify hydraulic fracturing treatments or sand control treatments performed through coil tubing, by greatly reducing fluid suspension property requirements. Downhole, a much reduced propensity to settle (as compared to conventional proppant or sand control particulates) may be achieved, particularly in highly deviated or horizontal wellbore sections. In this regard, the disclosed substantially neutral buoyancy proppant/particulate material may be advantageously employed in any deviated well having an angle of deviation of between about 0 degree and about 90 degrees with respect to the vertical. However, in one embodiment, the disclosed particulate material may be advantageously employed in horizontal wells, or in deviated wells having an angle with respect to the vertical of between about 30 degrees and about 90 degrees, alternatively between about 75 degrees and about 90 degrees. Thus, use of the disclosed relatively lightweight and/or substantially neutrally buoyant particulate materials disclosed herein may be employed to achieve surprising and unexpected improvements in fracturing and sand control methodology, including reduction in proppant pack and/or formation damage, and enhancement of well productivity.

In another embodiment, protective and/or hardening coatings, such as resins described elsewhere herein may be selected to modify or customize the specific gravity of a selected base particulate/proppant material, e.g., ground walnut hulls, etc. Modification of particulate specific gravity (i.e., to have a greater or lesser specific gravity) may be advantageously employed, for example, to provide proppant or sand control particulates of customized specific gravity for use as a substantially neutrally buoyant particulate with a variety of different weight or specific gravity carrier fluids. In yet another embodiment, protective and/or hardening-type coatings may be optionally curable to facilitate proppant pack/sand control particulate consolidation after placement. In this regard, curable resins are know to those of skill in the art, and with benefit of this disclosure may be selected to fit particular applications accordingly.

The disclosed relatively lightweight and/or substantially neutrally buoyant particulate/proppant materials may be employed with carrier fluids that are gelled, non-gelled, or that have a reduced or lighter gelling requirement as compared to carrier fluids employed with conventional fracture treatment/sand control methods. In one embodiment employing one or more of the disclosed substantially neutrally buoyant particulate materials and a brine carrier fluid, mixing equipment need only include such equipment that is capable of (a) mixing the brine (dissolving soluble salts), and (b) homogeneously dispersing in the substantially neutrally buoyant particulate material.

In one embodiment, a substantially neutrally buoyant particulate/proppant material may be advantageously pre-suspended and stored in a storage fluid (e.g., brine of near or substantially equal density), and then pumped or placed downhole as is, or diluted on the fly.

In one respect, disclosed are well treating methods (e.g., hydraulic fracturing, sand control) that may be employed to treat a well penetrating a subterranean formation, and that include introducing a relatively lightweight and/or substantially neutral density particulate/proppant material into the well. Individual particles of the particulate material optionally may have a shape with a maximum length-based aspect ratio of equal to or less than about 5. Individual particles may also be optionally coated with protective materials such as resins and/or hardeners, for example, "2AC" phenol formaldehyde hardener from BORDEN CHEMICAL. Examples of suitable relatively lightweight and/or substantially neutrally buoyant materials for use in aqueous based carrier fluids include, but are not limited to, ground or crushed nut shells, ground or crushed seed shells, ground or crushed fruit pits, processed wood, or a mixture thereof. Optional protective coatings for coating at least a portion of individual particles of such relatively lightweight and/or substantially neutrally buoyant materials include, but are not limited to at least one of phenol formaldehyde resin, melamine formaldehyde resin, urethane resin, or a mixture thereof. Other optional coating compositions known in the art to be useful as hardeners for such materials (e.g., coating materials that function or serve to increase the elastic modulus of the material) may be also employed in conjunction or as an alternative to protective coatings, and may be placed underneath or on top of one or more protective coatings. It will be understood by those of skill in the art that such protective and/or hardening coatings may be used in any combination suitable for imparting desired characteristics to a relatively lightweight and/or substantially neutrally buoyant particulate/proppant material, including in two or more multiple layers. In this regard successive layers of protective coatings, successive layers of hardening coatings, alternating layers of hardening and protective coatings, etc. are possible. Mixtures of protective and hardening coating materials may also be possible.

In another respect, disclosed is a relatively lightweight and/or substantially neutrally buoyant fracture proppant/particulate material for use in a hydraulic fracturing/sand control treatment that is a ground or crushed walnut shell material that is coated with a resin to substantially protect and water proof the shell. Such a material may have a specific gravity of from about 1.25 to about 1.35, and a bulk density of about 0.67. In one exemplary case, size of such a material may be about 12/20 US mesh size. In another exemplary case, sizes may range from about 4 mesh to about 100 mesh. Advantageously, in some embodiments, such ground walnut shells may serve to attract fines and formation particles by their resinous nature. In one embodiment for the manufacture of such particles for proppant/sand control applications, an optional hardener may be applied to a ground walnut shell material first followed by a urethane coating as described elsewhere herein that may vary in amount as desired. For example, such a coating material may be present in an amount of from about 1% to about 20%, alternatively from about 10% to about 20% by weight of total weight of individual particles. Alternatively, such a coating material may be present in an amount of from about 2% to about 12% by weight of total weight of individual particles. Amount of resin may depend, for example, on price and application. In this regard, particulates may be first sprayed or otherwise coated with a hardener, and a coating may be applied to be about 12% by weight of total weight of the particle.

In a further embodiment, individual particles (e.g., granules) of naturally-occurring materials (e.g., made from naturally-occurring materials or derivatives of naturally-occurring materials including, but not limited to, plant-based or agricultural-based materials such as nut hulls, seed shells, processed wood materials, derivatives of such plant-based or agricultural-based materials, etc.) may be optionally treated by exposure to a modifying agent that is capable of interacting with compounds present in or on a natural material in a way that acts to increase the ability of the naturally-occurring material to resist deformation (e.g., by increasing the elastic modulus or otherwise strengthening and/or hardening the naturally-occurring material). Examples of suitable modifying agents include, but are not limited to, any compound or other material capable of modifying (e.g., crosslinking, coupling or otherwise reacting with) one or more components present in the naturally-occurring material (e.g., natural resins, lignins and/or cellulosic fibers). Specific examples of suitable modifying agents include, but are not limited to, agents including polyisocyanates, silanes, siloxanes, and combinations thereof. Selected modifying agent/s may be advantageously used to increase the elastic modulus of a given naturally occurring material, for example, to make particles of a given naturally-occurring material more suitable (e.g., having increased hardness or strength to resist or prevent deformation under downhole in situ conditions of formation temperature and formation closure stress) for use as a relatively lightweight and/or substantially neutrally buoyant fracture proppant or sand control particulate material having increased effectiveness when exposed to higher closure stresses or other mechanical stresses that may be encountered downhole during a well treatment such as a hydraulic fracturing or sand control treatment.

Effectiveness of modifying agents may be optionally enhanced, for example, by facilitating interaction between a modifying agent and one or more components present in a naturally occurring material. In this regard interaction between a modifying agent and components present in a naturally occurring material may be facilitated using one or more enhancing agents (e.g., swelling agents, penetrating agents, etc.) and/or by exposing a naturally occurring material to one or more interaction-enhancing conditions that serve to enhance interaction with a modifying agent (e.g., vacuum and/or pressure impregnation of the modifying agent into a naturally occurring material, etc.). Examples of suitable enhancing agents include, but are not limited to, liquid or gaseous ammonia, dimethyl sulfoxide ("DMSO"), methyl pyrrolidone, etc.

Thus, disclosed herein is a method for forming modified and strengthened particles of naturally-occurring material that may be used as relatively low density proppant or sand control particulate for fracturing or gravel packing. In one exemplary embodiment, the modifying process may include exposing particles of the naturally-occurring material to a modifying agent (e.g., that includes an aqueous mixture of alkyl silanes, such as aminopropyltriethoxy silane) to strengthen the naturally-occurring material against deformation under closure stress. The modifying agent may be exposed to the naturally-occurring materials using any suitable method, including soaking or spraying, and may be allowed to interact or react with the naturally-occurring material with or without heating. The particles of naturally-occurring material may also be optionally exposed to an enhancing agent (e.g., liquid ammonia) to allow deeper penetration and interaction of the modifying agent with components of the naturally-occurring material, thus providing more uniform crosslinking or coupling of these components with less modifying agent and also helping to minimize or avoid localized crosslinking or coupling within the particles. A coating or layer of a material such as resin or epoxy may be added after treatment with a modifying agent to further enhance or increase strength of the naturally-occurring material, and/or to minimize downhole fluid incompatibilities.

Also disclosed herein is a method of using modified particles of naturally-occurring material as a relatively lightweight particulate material that may be introduced as part of a treating fluid into a well down wellbore tubulars (e.g., tubing, workstring, casing, drillpipe) or down coiled tubing, for example at concentrations of about 0.25 to about 15 pounds per gallon of treating fluid. In one exemplary embodiment, specific gravity of the particles of modified naturally-occurring material may be about 1.3, and therefore they may be used as a substantially neutrally buoyant proppant or sand control particulate in light or heavy brines, thus eliminating the need for complex crosslinked fracturing or sand control carrier fluids.

In one embodiment, the disclosed relatively lightweight particulate/proppant material may be introduced or pumped into a well as neutrally buoyant particles in, for example, a saturated sodium chloride solution carrier fluid or a carrier fluid that is any other completion or workover brine known in the art, for example, having a specific gravity of from about 1 to about 1.5, alternatively from about 1.2 to about 1.5, further alternatively about 1.2, thus eliminating the need for damaging polymer or fluid loss material. In one embodiment, such a material may be employed as proppant/sand control particulate material at temperatures up to about 150° F., and pressures up to about 1500 psi. However, these ranges of temperature and closure stress are exemplary only, it being understood that the disclosed materials may be employed as proppant/sand control materials at temperatures greater than about 150° F. and/or at closure stresses greater than about 1500 psi. For example, particles of naturally-occurring material may be exposed to suitable modifying agents, with or without enhancing agents and/or conditions, in one embodiment to form relatively lightweight particulate material that may be employed as proppant or sand control particulate at temperatures up to about 300° F., and/or at closure stresses up to about 10,000 psi, with temperatures greater than about 300° F. and/or closure stresses greater than about 10,000 psi also being possible. In any event, it will be understood with benefit of this disclosure that core and/or layer material/s (when present) and/or interaction-enhancing materials/conditions may be selected by those of skill in the art to meet and withstand anticipated downhole conditions of a given application.

Advantageously, in one embodiment the low specific gravity of the relatively lightweight proppant material may be taken advantage of to result in a larger fracture or frac pack width for the same loading (i.e., pound per square foot of proppant) to give much larger total volume and increased width for the same mass. Alternatively, this characteristic allows for smaller volumes of proppant material to be pumped while still achieving an equivalent width.

In one respect, disclosed herein is a method for treating a well penetrating a subterranean formation, including introducing a particulate material into the well. In this method, at least a portion of the particulate material may include particles of a naturally-occurring material modified by exposure to at least one modifying agent, the modifying agent being effective to modify the naturally-occurring material by increasing the ability of the naturally-occurring material to resist deformation.

In another respect, disclosed herein is a method of fracturing a subterranean formation, including introducing a particulate material suspended in a carrier fluid into the subterranean formation at a pressure above a fracturing pressure of the subterranean formation. In this method, at least a portion of the individual particles of the particulate material may be substantially neutrally buoyant in the carrier fluid and may include particles of a naturally-occurring material modified by exposure to at least one modifying agent in an amount effective to modify the naturally-occurring material. At least a portion of individual particles of the modified naturally-occurring material may include at least one of ground or crushed nut shells, ground or crushed seed shells, ground or crushed fruit pits, processed wood, or a mixture thereof, and the modifying agent may include at least one of a silane-based compound, siloxane-based compound, polyisocyanate-based compound, or a combination thereof.

In another respect, disclosed herein is a sand control method for a wellbore penetrating a subterranean formation, including introducing into the wellbore a slurry including particulate material and a carrier fluid, and placing the particulate material adjacent the subterranean formation to form a fluid-permeable pack that is capable of reducing or substantially preventing the passage of formation particles from the subterranean formation into the wellbore while at the same time allowing passage of formation fluids from the subterranean formation into the wellbore. In this method at least a portion of the individual particles of the particulate material may be substantially neutrally buoyant in the carrier fluid and may include particles of a naturally-occurring material modified by exposure to at least one modifying agent in an amount effective to modify the naturally-occurring material. At least a portion of individual particles of the modified naturally-occurring material may include at least one of ground or crushed nut shells, ground or crushed seed shells, ground or crushed fruit pits, processed wood, or a mixture thereof, and the modifying agent may include at least one of a silane-based compound, siloxane-based compound, polyisocyanate-based compound, or a combination thereof.

In another respect, disclosed herein is a particulate composition, including particles of a naturally-occurring material modified by exposure to at least one modifying agent, the modifying agent being effective to modify the naturally-occurring material by increasing the ability of the naturally-occurring material to resist deformation.

In another respect, disclosed is a method of modifying particles of a naturally-occurring material, including exposing particles of a naturally-occurring material to an effective amount of at least one modifying agent to modify the naturally-occurring material by increasing the ability of the naturally-occurring material to resist deformation. Also disclosed are particles of modified naturally-occurring material made by this method.

DETAILED DESCRIPTION OF SPECIFIC EMBODIMENTS

Figure 1:
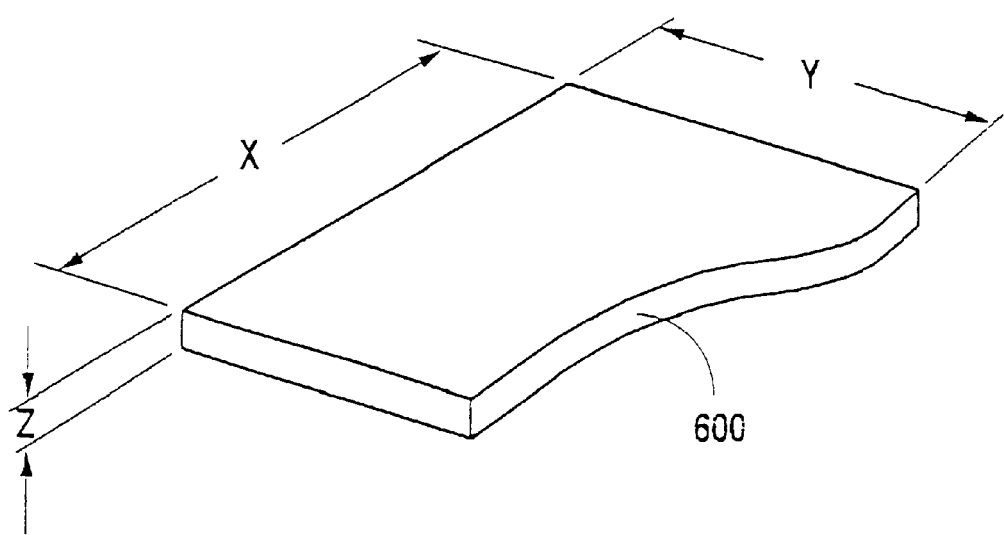
FIG. 1 is a representation of a particle of ground walnut hull material according to one embodiment of the disclosed method.

Examples of types of materials suitable for use as particulate material in the disclosed methods include particulates of naturally-occurring material, which may be further characterized in one embodiment as relatively lightweight and/or substantially neutrally buoyant proppant or sand control particulates as described elsewhere herein. It will be understood, however, that benefits of the disclosed particles and methods may also be realized in embodiments where the disclosed particulates are not employed as relatively lightweight and/or substantially neutrally buoyant proppant or sand control particulates.

In one embodiment, naturally-occurring materials suitable for treatment with one or more modifying agent/s to increase the ability of the naturally-occurring material to resist deformation as described further herein may be optionally employed. Examples of such naturally-occurring materials include, but are not limited to, any naturally-occurring material that contains naturally-occurring and crosslinkable molecules or compounds (e.g., mixtures of naturally-occurring resins, lignins and/or polymers that may be crosslinked). In this regard, examples of naturally occurring and cross-linkable molecules or compounds include, but are not limited to, those molecules having available hydroxyl groups suitable for crosslinking with one or more crosslinking agent/s. Specific examples of such molecules include, but are not limited to, polysaccharides found in plants that serve to enhance strength of plant materials including, but not limited to, polysaccharides containing Beta (1–4) linked sugars. Specific examples include, but are not limited to, cellulose and mannans. Other examples of suitable molecules or components include, but are not limited to, natural resins and ligands, specific substances such as polyphenolic esters of glucosides found in tannin from walnut hulls, etc. It will be understood that the term "naturally-occurring material" is used herein to describe any material based on a naturally-occurring substance having the characteristics as described further herein. Materials based on naturally-occurring materials include, but are not limited to, both underived and/or unprocessed naturally-occurring materials, as well as materials based on naturally-occurring materials that have been processed (e.g., mechanically or chemically processed) and/or derived (e.g.,. derivatives of naturally-occurring materials).

Specific examples of naturally-occurring particulate materials suitable for treatment with modifying agent/s and/or suitable for use as relatively lightweight and/or substantially neutrally buoyant proppant or sand control particulates include, but are not limited to, ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc. processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248–273 (entitled "Nuts"), Copyright 1981, which is incorporated herein by reference.

Additional information on materials and methods for use thereof may be found in U.S. Pat. No. 6,330,916, which is incorporated herein by reference. Further information on materials and methods may also be found in U.S. patent application Ser. No. 09/579,147, filed May 25, 2000 and U.S. patent application Ser. No. 09/579,146, filed May 25, 2000; each of which is incorporated herein by reference.

The particles disclosed herein (e.g., relatively lightweight and/or substantially neutrally buoyant proppant or sand control particulates, and/or particulates of naturally-occurring material that have been exposed to a modifying agent) may be mixed and pumped during any desired portion/s of a well treatment (e.g., hydraulic fracturing treatment, sand control treatment, etc.) and may be mixed in any desired concentration with a carrier fluid. In this regard, any carrier fluid suitable for transporting the disclosed particles into a well and/or subterranean formation fracture in communication therewith may be employed including, but not limited to, carrier fluids comprising salt water, fresh water, liquid hydrocarbons, and/or nitrogen or other gases. Suitable carrier fluids include or may be used in combination with fluids have gelling agents, cross-linking agents, gel breakers, curable resins, hardening agents, solvents, surfactants, foaming agents, demulsifiers, buffers, clay stabilizers, acids, or mixtures thereof.

In the practice of the disclosed method, the disclosed particles may be mixed with a carrier fluid in any manner suitable for delivering such a mixture to a wellbore and/or subterranean formation. In one embodiment, the disclosed particles may be injected into a subterranean formation in conjunction with a hydraulic fracturing treatment or other treatment at pressures sufficiently high enough to cause the formation or enlargement of fractures, or to otherwise expose the particles to formation closure stress. Such other treatments may be near wellbore in nature (affecting near wellbore regions) and may be directed toward improving wellbore productivity and/or controlling the production of fracture proppant or formation sand. Particular examples include gravel packing and "frac-packs." Moreover, such particles may be employed alone as a fracture proppant/sand control particulate, or in mixtures in amounts and with types of fracture proppant/sand control materials, e.g., conventional fracture or sand control particulate. Further information on hydraulic fracturing methods and materials for use therein may be found in U.S. Pat. No. 6,059,034 and in U.S. Pat. No. 6,330,916, which are incorporated herein by reference.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an openhole section. A screen assembly such as is known in the art may be placed or otherwise disposed within the wellbore so that at least a portion of the screen assembly is disposed adjacent the subterranean formation. A slurry including the disclosed particulate material (e.g., relatively lightweight and/or substantially neutrally buoyant particulates, and/or particulates of naturally-occurring material that have been exposed to a modifying agent) and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It will be understood that at least a portion of the individual particles of the slurry may be the disclosed relatively lightweight and/or substantially neutrally buoyant sand control particulates, and/or may be the disclosed naturally-occurring particulates that have been exposed to a modifying agent. Thus, it is possible that substantially all of the individual particles of the particulate material of the slurry or alternatively, only a portion of the individual particles of the particulate material of the slurry, may be the disclosed particulates. In the latter case, the balance of the particulate material of the slurry may be another material, such as a conventional gravel pack particulate.

Although one embodiment of sand control method employing a screen has been described in the preceding paragraph, it will be understood with benefit of this disclosure that the disclosed particulate materials may be used with any method in which a pack of particulate material is formed within a wellbore that it is permeable to fluids produced from a wellbore (e.g., oil, gas, water, etc.) but that substantially prevents or reduces production of formation materials (e.g., formation sand, etc.) from the formation into the wellbore. Such methods may or may not employ a gravel pack screen, may be introduced into a wellbore at pressures below, at or above the fracturing pressure of the formation (e.g., frac pack), and/or may be employed in conjunction with resins (e.g., sand consolidation resins, etc.) if so desired.

In one embodiment, specific gravity of such materials may range from about 0.4 to about 4, alternatively from about 0.8 to about 4. In another embodiment, specific gravity of such materials may range from about 0.4 to about 1.5, alternatively from about 0.5 to about 1.5. In another embodiment, specific gravity of such materials may range from about 0.5 to about 2, alternatively from about 0.5 to about 1.5, alternatively from about 1 to about 1.5, alternatively from about 1.1 to about 1.4, alternatively from about 1.2 to about 1.3, alternatively about 1.2, and alternatively about 1.3. It will be understood that the foregoing embodiments are exemplary only and greater or lesser values are also possible. With benefit of this disclosure, those of skill in the art will understand that selection of suitable specific gravity of such a proppant/particulate will depend, in part, on the specific gravity of the carrier fluid and on whether it is desired that the selected proppant/particle be relatively lightweight or substantially neutrally buoyant in the selected carrier fluid, and/or whether or not it is desired that the carrier fluid be non-gelled or non-viscosified.

It will be understood with benefit of this disclosure that suitable particulate materials (e.g., relatively lightweight and/or substantially neutrally buoyant particulates, and/or naturally-occurring particulates that have been exposed to a modifying agent) may be formed from materials that are chipped, ground, crushed, or otherwise processed to produce particulate material having any particle size or particle shape suitable for use in the methods disclosed herein. In one exemplary embodiment, particle sizes include, but are not limited to, sizes ranging from about 4 mesh to about 100 mesh, alternatively from about 12 mesh to about 50 mesh. In another exemplary embodiment, particle sizes include, but are not limited to, sizes ranging from about 8 mesh to about 40 mesh, alternatively from about 14 mesh to about 40 mesh, alternatively from about 16 mesh to about 40 mesh, alternatively from about 20 mesh to about 30 mesh. Shapes of such particles may vary, but in one embodiment may be utilized in shapes having maximum length-based aspect ratio values as described elsewhere herein for particles, and in one embodiment may have a maximum length-based aspect ratio of less than or equal to about 5. Once again, the preceding ranges of values are exemplary only, and values outside these ranges are also possible.

In one embodiment, particle size of the disclosed particulate materials may be selected based on factors such as anticipated downhole conditions and/or on relative strength or hardness of the particulate material/s selected for use in a given application. In this regard, larger particle sizes may be more desirable in situations where a relatively lower strength particulate material is employed. For example, 12/20 mesh ground walnut hulls may be desirable for use where closure stresses of up to about 1500 psi are anticipated. Smaller particle sizes may be more desirable in situations where a relatively higher strength particulate material is employed. For example 20/40 mesh ground walnut hulls treated with a modifying agent described elsewhere herein may be desirable for use where closure stresses of up to about 3000 psi, alternatively up to about 4000 psi are anticipated.

Type/s of particulate materials for use as a particulate as disclosed herein may also be selected based on factors such as anticipated downhole conditions. In one exemplary embodiment, walnut hull-based particulates may be desirable for use where downhole temperatures of up to about 200° F. are anticipated, and apricot pit-based particulates may be desirable for use where downhole temperatures of up to about 250° F., alternatively of up to about 275° F. are anticipated. However, it will be understood that walnut hull-based materials may also be employed at temperatures greater than about 200° F., and apricot pit-based materials may be employed at temperatures greater than about 275° F. In this regard, type/s of particulate materials may be selected with benefit of this disclosure for use in a given application by those of skill in the art to meet requirements of a given application, (e.g., including to withstand anticipated downhole conditions), for example, using one or more testing methods such as those disclosed elsewhere herein. Furthermore, given particulate material/s may be treated (e.g., exposed to a modifying agent, coated with protective and/or hardening layers, etc.) so as to render a given particulate material suitable for the requirements of a given application.

Specific examples of suitable materials suitable for use in both relatively low closure stress embodiments and in relatively higher closure stress embodiments (e.g., when treated with a modifying agent as described herein) include, but are not limited to, ground or crushed nut shells available from suppliers such as "COMPOSITION MATERIALS, INC." of Milford, Conn.; "AGRASHELL, INC." of Bath, Pa.; "BAROID", and/or "CALIFORNIA NUT ASSOCIATION"; "WALNUT SHELLING, INC." of Las Molinas, Calif.; "ECOSHELL" of Corning, Calif. These products include "walnut shell grit" available from "COMPOSITION MATERIALS, INC.", "AD-3" ground walnut hulls from "AGRASHELL" (having a particle size of about 12/20 mesh, a specific gravity of about 1.2, and a maximum length-based aspect ratio of about 5), as well as "AD-6B" ground walnut shells (having a particle size of about 20/40 mesh, a specific gravity of about 1.2, and a maximum length-based aspect ratio of about 5). Such ground walnut hull material is available, for example, for use as a blasting media. Other suitable products include, but are not limited to, ground walnut hull material from "ECOSHELL" or "FRITZ" having a particle size of about 16/30 mesh, a specific gravity of about 1.3, and a maximum length-based aspect ratio of about 1:1, alternatively of about 2:1.

FIG. 1 shows a simplified representation of a particle 600 of ground walnut hull material having relative dimension ratio of X:Y:Z. In one exemplary embodiment employing ground walnut hull material, values of X, Y and Z may be expressed as a relative ratio (e.g., independent of any particular units of measurement employed) as follows: X may be from about 1 to about 5; Y may be from about 1 to about 5, and Z may be about 1. Alternatively, X may be from about 2 to about 5; Y may be from about 2 to about 5, and Z may be about 1. These given ranges are exemplary only, and relative dimensional values of any one or more of X, Y, and Z may fall outside these value ranges. In alternate embodiments, ground nuts such as ground walnut hulls may be processed to have a substantially spherical or beaded shape as well.

In one exemplary embodiment, ground walnut hulls having a particle size of about 12/20 mesh and a maximum length-based aspect ratio of about 5 may be employed as a proppant and/or sand control particulate. These and other materials may be treated (e.g., with modifying agent and/or coated) for use in these applications as described elsewhere herein.

As previously mentioned, naturally-occurring materials may be optionally strengthened or hardened in one embodiment by exposure to a modifying agent that is capable of interacting with compounds present in or on a naturally-occurring material in a way that acts to strengthen or harden the naturally occurring material (e.g., by increasing the elastic modulus of the naturally-occurring material). In this regard, any naturally-occurring material and/or derivatized naturally-occurring material may be employed that is suitable for treatment with one or more modifying agent/s in a manner as described elsewhere herein. A suitable naturally occurring material may include, for example, any material or derivatized material that contains naturally-occurring and crosslinkable molecules or compounds (e.g., mixtures of naturally-occurring resins, lignins and/or polymers that may be crosslinked). Examples of naturally occurring and crosslinkable molecules or compounds include, but are not limited to, those molecules having terminal hydroxyl groups suitable for crosslinking with one or more crosslinking agent/s. Specific examples of such molecules include, but are not limited to, polysaccharides composed of $\beta(1-4)$ linked sugars such as cellulose, mannose, etc. In one exemplary embodiment, individual particles (e.g., granules) of naturally-occurring materials (e.g., made from nut hulls, seed shells, processed wood materials, etc.) may be employed. Included are any of the specific examples of nut hulls, seed shells and processed wood materials described elsewhere herein.

Selected modifying agent/s may be advantageously used to modify particles of a given naturally-occurring material so that they have increased resistance (e.g., partial or complete resistance) to deformation under in situ formation or downhole conditions as compared to the same type of particles of naturally-occurring material that have not been so modified. In this regard, a selected modifying agent/s may be employed to make particles of a given naturally-occurring material more suitable for use as a fracture proppant and/or sand control particulate material having increased effectiveness when exposed to higher closure stresses or other mechanical stresses that may be encountered downhole during a well treatment such as a hydraulic fracturing or sand control treatment. In one exemplary embodiment, a modifying agent/s may be characterized as an agent that is effective to increase the hardness or strength of a given naturally occurring material (e.g., one that is effective to increase the elastic modulus of the given naturally occurring material). While not wishing to be bound by theory, it is believed that a modifying agent may increase the resistance to deformation of a given naturally-occurring material by reacting (e.g., crosslinking) with components (e.g., resins, polymers, etc.) present in the naturally-occurring material.

In one embodiment, one or more modifying agents may be employed to significantly increase the elastic modulus of a given naturally-occurring material as measured under standard conditions of temperature and pressure ("STP"). For example, in one exemplary embodiment, particles of ground walnut hulls having an untreated elastic modulus of about 40,000 psi to about 50,000 psi may be treated with one or more of the modifying agents described herein to increase the elastic modulus to a value greater than or equal to about 40,000 psi, alternatively to a value greater than or equal to about 50,000 psi, alternatively to a value from about 40,000 psi to about 1,500,000 psi, alternatively to a value from about 40,000 psi to about 1,000,000 psi, alternatively to a value from about 40,000 psi to about 500,000 psi, alternatively to a value from about 40,000 psi to about 400,000 psi, alternatively to a value from about 50,000 psi to about 1,500,000 psi, alternatively to a value from about 50,000 psi to about 1,000,000 psi, alternatively to a value from about 50,000 psi to about 500,000 psi, alternatively to a value from about 50,000 psi to about 400,000 psi, alternatively to a value of from about of from about 400,000 psi to about 1,500,000 psi, alternatively to a value of from about 500,000 psi to about 1,000,000 psi, alternatively to a value of greater than or equal to about 400,000 psi, alternatively to a value of greater than or equal to about 500,000 psi, alternatively to a value of greater than or equal to about 1,000,000 psi, alternatively to a value of from about 1,000,000 psi to about 1,500,000 psi, with it being understood that these values are exemplary only and that values outside these ranges are also possible. In other embodiments, it is possible that treatment with one or more modifying agents may also serve to at least partially increase the ability of naturally-occurring particulate material to withstand damage or degradation from exposure to downhole fluids such as formation, drilling, workover fluids (e.g., salt water, acid, etc.), although it will be understood that this characteristic need not necessarily be present.

In one embodiment, examples of suitable modifying agents include, but are not limited to, any compound or other material effective for modifying (e.g., crosslinking, coupling or otherwise reacting with) one or more components present in the naturally-occurring material (e.g., natural resins, lignins and/or cellulosic fibers). In a further embodiment, suitable modifying agents may be optionally further characterized as being effective for modifying one or more components present in a occurring-occurring material without degrading or otherwise damaging strength or hardness of naturally-occurring material (e.g., without causing hydrolysis of the resins and polysaccharides), and/or without producing damaging by-products during modification that act to degrade or otherwise damage strength or hardness of naturally-occurring material (e.g., without liberating acids such as hydrochloric acid, organic acids, etc.). In one exemplary embodiment, modification by-products produced by a suitable modifying agent may be characterized as substantially non-reactive and non-damaging to the strength or hardness of a given modified occurring-occurring particulate material (e.g., alcohol-based by-product such as methanol being substantially non-damaging to ground walnut hull material). It is also possible that such substantially non-damaging by-products may be optionally released or liberated from the naturally-occurring material during post-modification treatment, e.g., drying of a modified occurring-occurring particulate material.

Examples of suitable types of modifying agents include, but are not limited to, compounds containing silicon-oxygen linkages, compounds containing cyanate groups, epoxy groups, etc. Specific examples of suitable modifying agents include, but are not limited to, polyisocyanate-based compounds, silane-based compounds, siloxane-based compounds, epoxy-based combinations thereof etc.

In one embodiment, a modifying agent may include one or more silane-based compounds having the following chemical formula (I):

(I)

wherein in one embodiment R is branched or linear aliphatic carbon chain that may be saturated or unsaturated (e.g., containing one or more double and/or triple bonds), and which may have from about 1 to about 10 carbon atoms, alternatively from about 1 to about 5 carbon atoms, and further alternatively about 3 carbon atoms; and wherein each R' is independently branched or linear carbon chain that may be saturated or unsaturated (e.g., containing one or more double and/or triple bonds), and which may have from about 1 to about 4 carbon atoms, alternatively from about 1 to about 2 carbon atoms, and further alternatively about 2 carbon atoms; it being understood that each R' group may be the same or different structure than one or both of the other R' groups. In another embodiment, R may be further characterized as alkanyl or alkenyl carbon chain having the above-properties. In other embodiments, R may be characterized as an aromatic carbon chain or alicyclic carbon chain.

In a further embodiment, one or more of the carbon chains R and/or R' of formula (I) may be optionally and independently derivatized, e.g., the R carbon chain and/or one or more of the R' carbon chains may each contain one or more amino functional groups, one or more halogen groups (e.g., tetrachlorosilane, methyltrichlorosilane, etc.), two or more isocyanate functional groups, two or more epoxy groups, etc. Where halogen groups (e.g., such as chlorine groups) are present, it may be desirable to rapidly neutralize any acidic by-products that may be created during a modification reaction.

In one exemplary embodiment, a silane-based modifying agent may include an amino-functional silane-based compound such as gamma-aminopropyltriethoxy silane, a isocyanate-functional silane-based compound such as gamma isocyanatopropyltriethoxy silane, mixtures thereof, etc.

Examples of commercially available silane-based products that may be employed as modifying agents in the practice of the disclose methods and compositions include, but are not limited to, silane-based products (e.g., as crosslinkers, coupling agents, adhesion promoters, stereomodifiers, endcappers, etc.) available from sources such as NALCO/EXXON CHEMICALS; CROMPTON of South Charleston, W. Va. Specific examples of commercially available silane-based products available from CROMPTON include CoatOSil® 1706 Silane (vinyl silane monomer), CoatOSil® 1757 Silane, CoatOSil® 1770 Silane, EURENOR® 5020 (liquid isobuytlisopropyldimethoxysilane), EURENOR® 5021 (liquid diisopropylmethoxysilane), EURENOR® 5022 (liquid diisobutyldimethoxysilane), EURENOR® 5023 (liquid dicyclopentyldimethoxysilane), Silcat® R Silane (vinylsilane with grafting and crosslinking catalysts), Silcat® RHE Silane (crosslinking system of silane, peroxide and catalyst), Silcat® RHS Silane (crosslinking system of silane, peroxide catalyst and antioxidants), Silcat® VS-735/1 Silane (crosslinking system of silane, peroxide, antioxidants and metal deactivator), Silcat® VS-758/0 Silane (stabilized crosslinking system of silane, peroxide and catalyst), Silcat® VS-870 Silane (stabilized crosslinking system of silane, peroxide, catalyst, antioxidants and metal deactivator), Silcat® VS-928 Silane (stabilized crosslinking system of silane, peroxide, catalyst, antioxidants and metal deactivator), Silcat® VS-963 Silane (stabilized crosslinking system of silane, peroxide, catalyst, antioxidants and metal deactivator), Silox® VS-911 Silane (liquid silane system), Silquest® A-1100™ Silane (gamma-aminopropyltriethoxysilane), Silquest® A-1101 Silane (technical grade amino silane), Silquest® A-1102 Silane (technical grade amino silane), Silquest® A-1110 Silane (primary amino silane), Silquest® A-1120 Silane, Silquest® A-1126 Silane (amino silane), Silquest® A-1128 Silane (amino silane), Silquest® A-1160 Silane (ureido silane), Silquest® A-1170 Silane (secondary aminofunctional silane), Silquest® A-1289 Silane, Silquest® A-1310 Silane, Silquest® A-137 Silane (monomeric alkylalkoxysilane), Silquest® A-151 Silane, Silquest® A-1524 Silane (100-percent active ureidosilane), Silquest® A-1589 Silane (disulfide silane), Silquest® A-171 Silane, Silquest® A-172 Silane (vinylfunctional coupling agent), Silquest® A-174 Silane, Silquest® A-186 Silane (epoxy functional silanes), Silquest® A-187 Silane (epoxy functional silanes), Silquest® A-189 Silane, Silquest® A-2171 Silane (silane compound having vinyl and silane functionality), Silquest® Alink 15 Silane (secondary amino silane endcapper), Silquest® RC-1 Silane (organosilicone coupling agent), Silquest® RC-2 Silane, Silquest® Wetlink 78 Silane, Silquest® Y-11637 Silane (primary aminosilane), Silquest® Y-11683 Silane (di-, tri-functional ethoxy silane), Silquest® Y-5997 Silane, XL-PEarl® 31 Blend, XL-PEarl® 50 Blend, XL-PEarl® 51 Blend, XL-PEarl® 52 Blend, XL-PEarl® 60 Blend, XL-PEarl® 70 Blend, etc.

In another embodiment, a modifying agent may include one or more siloxane-based compounds having the following chemical formula (II):

R—Si(OR')$_2$—O—Si(OR")$_2$—R  (II)

wherein in one embodiment R is a branched or linear aliphatic carbon chain that may be saturated or unsaturated (e.g., containing one or more double and/or triple bonds), and which may have from about 1 to about 10 carbon atoms, alternatively from about 1 to about 5 carbon atoms, and further alternatively about 3 carbon atoms; wherein each R' and each R" is independently a branched or linear carbon chain that may be saturated or unsaturated (e.g., containing one or more double and/or triple bonds), and which may have from about 1 to about 4 carbon atoms, alternatively from about 1 to about 2 carbon atoms, and further alternatively about 2 carbon atoms; it being understood that one R' may be the same or different than the other R' group, that one R" may be the same or different than the other R" group, and that one or both R' groups may be the same or different than one or both R" groups. In another embodiment, R may be further characterized as alkanyl or alkenyl carbon chain having the above-properties. In other embodiments, R may be characterized as an aromatic carbon chain or alicyclic carbon chain.

In a further embodiment, one or more of the carbon chains R and/or R' of formula (II) may be optionally and independently derivatized, e.g., the R carbon chain and/or one or more of the R' and/or R" carbon chains may each contain one or more amino functional groups, two or more isocyanate functional groups, two or more epoxy groups, etc.

Specific examples of siloxane-based compounds include, but are not limited to, an aqueous solution of alcohol-free aminoalkyl siloxane such as Silquest® A-1106 Silane available from CROMPTON, and an aqueous solution of aminoalkyl siloxane available from B J SERVICES as "FSA-1" and from NALCO/EXXON CHEMICALS as "TEK-STIM 3535".

In another embodiment, a modifying agent may include one or more polyisocyanate-based compounds having the following chemical formula (III):

OCN—R—NCO  (III)

wherein R is at least one of phenyl, derivatized phenyl, or an aliphatic carbon chain having from about 2 to about 10 carbon atoms, alternatively having from about 2 to about 6 carbon atoms, and further alternatively having about 6 carbon atoms.

In one exemplary embodiment, a polyisocyanate-based modifying agent may include polyisocyanate-based compounds such as toluene diisocyanate, heaxamethylene polyisocyanate, etc.

In another embodiment, a modifying agent may include one or more epoxy-based compounds having two or more epoxy groups.

Individual particles of naturally-occurring materials may be strengthened and/or hardened by exposure to a modifying agent using any wet or dry process suitable for causing interaction between the modifying agent and one or more compounds present in or on the natural material in a way that acts to strengthen or harden the naturally occurring material (e.g., by increasing the elastic modulus of the naturally-occurring material). Exposure methodologies that are the same as, or that are similar to, resin coating methods described elsewhere herein (e.g., to coat a first core material with a second resin material) may also be employed to expose particles of naturally-occurring material to a modifying agent (e.g., by manufacturers such as FRITZ Industries of Mesquite, Tex., etc.). Specific examples of suitable exposure methods include, but are not limited to, by soaking of the naturally-occurring material in a modifying agent (e.g., in one embodiment using equal parts of modifying agent and naturally-occurring material), by dipping the naturally-occurring material in a modifying agent, by spraying a modifying agent on to the naturally-occurring material (e.g., as particles continuously move through a pneumatic mover or basket), by mixing naturally-occurring particulate material with liquid, atomized and/or gaseous modifying agent in a vertical mixer (e.g., as particles continuously move through a vertical mixer), by flowing modifying agent through a permeable bed or pack of the naturally-occurring particles in a pressurized container. Drying of particles after exposure may be accomplished, for example, by continuously dropping through heated air (e.g., at an elevated temperature of about 375° F.).

Exposure conditions may be selected and/or varied to enhance interaction between modifying agent and naturally-occurring material, including selected combinations of temperature and/or pressure. For example, naturally-occurring particulate material may be raised to an elevated temperature (e.g. from about 100° F. to about 400° F., alternatively from about 150° F. to about 375° F.) during or after exposure to a modifying agent (e.g., using any of the exposure methods described herein) to facilitate the interaction between a modifying agent and the particulate material. Besides serving to dry the naturally-occurring material, exposure to an elevated temperature also may serve to further drive the reaction between the modifying agent and reactive components of the naturally-occurring material, as well as to burn off softer outer layers of the particles of naturally-occurring material that may be present. However, it will be understood that heating is not necessary.

Particles of naturally-occurring material may also be partially or completely impregnated using vacuum and/or pressure impregnation methods, such as those methods described elsewhere herein. In one exemplary embodiment, particles of naturally-occurring material may be immersed in a liquid modifying agent in a sealed container at room temperature, a vacuum (e.g., of from about −18 to about −20 psi) applied to the container for a period of time (e.g., about 2 hours), and the particles then separated from the liquid modifying agent and dried using dry heat (e.g., at an elevated temperature of about 200° F.). In another exemplary embodiment, particles of naturally-occurring material may be immersed in a liquid modifying agent in a sealed container at room temperature, and pressure (e.g., from about 1 psig to about 1000 psig) applied to the container for a period of time (e.g., about 1 hours), and the particles then separated from the liquid modifying agent and dried using dry heat (e.g., for about 1 hour at an elevated temperature of about 200° F.). In yet another exemplary embodiment, combination of vacuum impregnation and pressure impregnation methods may be employed.

Particles of a selected naturally-occurring material (e.g., ground walnut hulls) may be exposed to any amount of a selected modifying agent effective for strengthening or hardening the selected naturally occurring material. In this regard, it will be understood that the amount of modifying agent employed relative to naturally-occurring materials may be varied as necessary to achieve a desired degree of hardening or strengthening of the naturally-occurring material, for example, to fit conditions of a particular application (e.g., particular anticipated downhole conditions), to satisfy cost limitations, etc. It will also be understood that the amount of modifying agent employed relative to naturally-occurring material may vary according to the number and types of reactive functional groups present on molecules of the modifying agent. For example, in one embodiment particles of naturally-occurring material may be exposed to a modifying agent (e.g., silane-based compound, siloxane-based compound) in an amount of from about 0.001% to about 30% of modifying agent by weight of the particles, from about 0.001% to about 26% of modifying agent by weight of the particles, from about 0.001% to about 10% of modifying agent by weight of the particles, alternatively from about 0.001% to about 2% of modifying agent by weight of the particles, from about 0.001% to about 1% of modifying agent by weight of the particles, alternatively from about 0.01% to about 30% of modifying agent by weight of the particles, from about 0.01% to about 26% of modifying agent by weight of the particles, from about 0.01% to about 10% of modifying agent by weight of the particles, alternatively from about 0.01% to about 2% of modifying agent by weight of the particles, from about 0.01% to about 1% of modifying agent by weight of the particles, alternatively from about 0.1% to about 30% of modifying agent by weight of the particles, from about 0.1% to about 26% of modifying agent by weight of the particles, from about 0.1% to about 10% of modifying agent by weight of the particles, alternatively from about 0.1% to about 2% of modifying agent by weight of the particles, from about 0.1% to about 1% of modifying agent by weight of the particles, alternatively from about 1% to about 2% of modifying agent by weight of the particles.

In an alternative and exemplary embodiment, particles of naturally-occurring material (e.g., ground walnut hulls) may be introduced into a vertical mixer, heated to a temperature of from about 100 to about 400° F. and sprayed or otherwise exposed to a modifying agent. For example, ground walnut hulls may be exposed to a siloxane-based compound (e.g., FSA-1) in an amount of about 26% of modifying agent by weight of naturally-occurring particulate material. It will be understood that the foregoing ranges of modifying agent amount are exemplary only, and that particles of naturally-occurring materials may be exposed to modifying agent/s in other amounts (e.g., including up to and greater than about 100% of modifying agent by weight of the particles). For example, by soaking particles of naturally-occurring material in a suitable modifying agent in conjunction with vacuum and/or pressure impregnation, exposure values of from about 0.1% to about 30% alternatively about 10% of modifying agent by weight of naturally-occurring particulate material may be achieved.

Modifying agents may be diluted as so desired in a suitable solvent prior to treating particles of a naturally-occurring material. Examples of solvent materials with which modifying agents may be diluted include low surface tension solvents. Specific examples of suitable diluting materials include, but are not limited to, ethylene glycol monobutylether ("EGMBE"), alcohols (e.g., methanol, ethanol, etc.), water-based solvents mixed with low surface tension surfactants (e.g., fluro-surfactants, etc.), organic fluids such as diesel, etc.

Effectiveness of modifying agents may be optionally enhanced, for example, by facilitating interaction between a modifying agent and one or more components present in a naturally occurring material. In this regard interaction between a modifying agent and components present in a naturally occurring material may be facilitated using one or more enhancing agents (e.g., swelling agents, penetrating agents, etc.) and/or by exposing a naturally occurring material to one or more enhancing conditions such as described above that serve to enhance interaction with a modifying agent (e.g., vacuum and/or pressure impregnation). Examples of suitable enhancing agents include, but are not limited to, liquid or gaseous ammonia, dimethyl sulfoxide ("DMSO"), methyl pyrrolidone, etc. While not wishing to be bound by theory, it is believed that such enhancing agents act to facilitate interaction between a modifying agent and one or more components present in the naturally-occurring material (e.g., natural resins, lignins and/or cellulosic fibers) by opening the matrix (e.g., by causing swelling) of the matrix of the naturally-occurring material or otherwise penetrating through the matrix of the naturally-occurring material to allow deeper penetration by the modifying agent. By facilitating interaction between modifying agent and naturally-occurring material, an enhancing agent may make possible the use of less modifying agent relative to naturally-occurring particulate material to produce the same or substantially the same results, reducing cost of treatment.

In one embodiment, selection of appropriate enhancing agent may be made based on compatibility with selected modifying agent. For example, ammonia may be more desirable for use as an enhancing agent when employed with silane-based or siloxane-based modifying agent than with polyisocyanate-based modifying agents, due to low affinity of silane-based and siloxane-based modifying agents for nitrogen atoms relative to polyisocyanate-based modifying agents. In another example, DMSO may be desirable for use as an enhancing agent in conjunction with polyisocyanate-based modifying agents. However, it will be understood that any desired combination of one or more enhancing agent/s and one or more modifying agent/s may be employed to produce modified naturally-occurring particulate material having desired characteristics (e.g., strength, hardness, resistance to deformation, etc.) to fit a given application.

Individual particles of naturally-occurring materials may be exposed to one or more enhancing agent/s using any methodology suitable for facilitating interaction between the particles of naturally-occurring materials and one or more modifying agents to which the naturally occurring material may be exposed. In this regard, particles of naturally-occurring material may be exposed to one or more enhancing agents prior to, simultaneously with, and/or after exposure to one or more modifying agents as long as the enhancing agent acts to facilitate interaction between the modifying agent/s and the naturally-occurring material particulates. Exposure of naturally-occurring particulate material to enhancing agent may be accomplished using any method suitable for contacting the particles with the enhancing agent/s including, for example, the same methods described above for exposing naturally-occurring particulate material to a modifying agent, e.g., coating, soaking, dipping, spraying, mixing, flowing, etc. Furthermore, vacuum and/or pressure impregnation, and/or elevated temperatures may be also be employed where applicable and desired to increase effectiveness of an enhancing agent.

In one exemplary embodiment, particles of naturally-occurring particulate material (e.g., ground walnut hulls) may be placed in a container through which liquid or gaseous enhancing agent (e.g., liquid, atomized or gaseous ammonia) is flowed to expose the particulate material to the enhancing agent. Following and/or during exposure to the enhancing agent, the particulate may be exposed to liquid, atomized or gaseous modifying agent/s (e.g., gamma-aminopropyltriethoxy silane) in the same container by flowing the modifying agent though the container in a manner similar to the enhancing agent. Alternatively, the particulate may be removed from the container and exposed to modifying agent/s using a separate exposure step, such as by coating, soaking, spraying, etc. In another exemplary embodiment, particles of naturally-occurring particulate material (e.g., ground walnut hulls) may be introduced into a vertical mixer through which atomized or gaseous enhancing agent (e.g., atomized or gaseous ammonia) is flowed to expose the particulate material to the enhancing agent. Following and/or during exposure to the enhancing agent, the particulate may be exposed to atomized or gaseous modifying agent/s (e.g., gamma-aminopropyltriethoxy silane) in the same mixer by flowing the modifying agent though the mixer in a manner similar to the enhancing agent. Alternatively, the particulate may be removed from the mixer for exposure to modifying agent/s in a separate exposure step as described immediately above.

Following treatment with modifying agent (with or without optional enhancing agent), particles of naturally-occurring material may be employed as proppant and/or sand control particles in any of the embodiments described elsewhere herein. In one embodiment, particles of a modified naturally-occurring material may be utilized as relatively lightweight particulate/proppant materials. In such an embodiment, amounts and type of modifying agent may be selected so that specific gravity of a naturally-occurring particulate material may be affected relatively little, if at all, by treatment with a modifying agent. For example, specific gravity of ground walnut hulls treated with about 26% by weight of an aminopropyltriethoxy silane modifying agent may be changed from about 1.2 to about 1.3. Such modified ground walnut hull particulate material may be introduced or pumped into a well as neutrally buoyant particles in a carrier fluid that may be, for example, a 11.5 pound per gallon (ppg) brine.

In one embodiment, particles of a modified naturally-occurring material may be utilized as particulate/proppant material suitable for use at more severe or demanding downhole conditions (e.g., at higher downhole temperatures and/or under higher downhole conditions of closure stress) than the conditions under which particles of the same, but un-modified, naturally-occurring material may be suitably employed. For example, in one exemplary embodiment modified particulate material may be formulated as described herein and introduced or pumped (e.g., as neutrally buoyant proppant and/or sand control particulate) in any suitable carrier fluid (e.g., saturated sodium chloride solution carrier fluid or other completion or workover brine) into a well for exposure to downhole temperatures of greater than or equal to about 170° F., alternatively greater than or equal to about 200° F., alternatively greater than or equal to about 225° F., alternatively greater than or equal to about 250° F., alternatively greater than or equal to about 270° F. In another exemplary embodiment, modified particulate material may be formulated as described herein and introduced or pumped into a well for exposure to downhole temperatures of up to about 200° F., alternatively up to about 225° F., alternatively up to about 250° F., alternatively up to about 270° F., and further alternatively up to about 300° F. In another exemplary embodiment, modified particulate material may be formulated as described herein and introduced or pumped into a well for exposure to downhole temperatures of from about 100° F. to about 300° F., alternatively from about 170° F. to about 300° F., alternatively from about 200° F. to about 300° F., alternatively from about 225° F. to about 300° F., alternatively from about 250° F. to about 300° F., alternatively from about 270° F. to about 300° F., and further alternatively from about 150° F. to about 250° F.

In another exemplary embodiment, modified particulate material may be so introduced into a well for exposure to closure stresses of greater than or equal to about 4,000 psi, alternatively of greater than or equal to about 5000 psi, alternatively of greater than or equal to about 6000 psi, alternatively of greater than or equal to about 8000 psi, alternatively of greater than or equal to about 10,000 psi, alternatively of from about 4000 psi to about 10,000 psi, alternatively from about 5,000 psi to about 6000 psi, alternatively from about 5000 psi to about 8,000 psi, alternatively from about 5000 psi to about 10,000 psi. In another exemplary embodiment, modified particulate material may be so introduced into a well for exposure to closure stresses of up to about 5000 psi, alternatively up to about 6000 psi, alternatively up to about 8000 psi, alternatively up to about 10,000 psi, alternatively from about 1000 psi to about 4000 psi, alternatively from about 1000 psi to about 5000 psi, alternatively from about 1000 psi to about 6000 psi, further, alternatively from about 1000 psi to about 8000 psi, further alternatively from about 1000 psi to about 10,000 psi. It will be understood that these ranges of temperature and closure stress are exemplary only, and that the disclosed modified particulate materials may be employed as proppant and/or sand control materials at temperatures greater than or equal to about 300° F. and/or at closure stresses greater than or equal to about 10,000 psi, and that combinations of particular naturally-occurring materials, particular modifying agents, particular enhancing agents and/or manufacturing conditions may be selected based on the teaching of the disclosure herein to meet and withstand anticipated downhole conditions of a given application.

Naturally-occurring particulate material that has been treated with modifying agent may be employed as relatively lightweight particulate/proppant material without further treatment. However, modified particles of naturally-occurring material may also be coated or at least partially surrounded with at least one layer of a second material (e.g., resin, epoxy, etc.) that may be selected to act to harden and/or isolate or protect the first material from adverse formation or wellbore conditions in a manner as described below.

In one embodiment, a multi-component relatively lightweight and/or substantially neutrally buoyant proppant/sand control particle may include a first material and at least one additional, or second, different material. The first material and at least one second material may have different values of in situ Young's modulus and/or be of differing composition. Alternatively, the first material and at least one second material may have similar or same values of in situ Young's modulus and/or be of similar or same composition. At least one of the first or second materials may optionally be a naturally-occurring material that has been modified by exposure to one or more modifying agents and/or enhancing agents.

In one embodiment, a second material may be present as a protective layer around a first material core, as described further herein. In another embodiment, a second material may be present to alter the overall modulus of a particulate formed therefrom, such as to function as a hardening material. For example, overall in situ Young's modulus of modified or unmodified ground walnut hulls may be increased by coating such particles with a layer of relatively hard resin having a higher in situ Young's modulus. A single material may be present to perform both protective and hardening functions, or separate materials may be present to perform each of these respective functions. As used herein, a "layer" refers to a second material that at least partially or completely surrounds a first core material. A layer includes materials that adhere to or are otherwise disposed on the surface of a core material, and/or to those materials that are at least partially absorbed or permeated into a first core material.

In one embodiment, the two or more materials may be configured in virtually any manner desired to form multi-component particles (for example, as described elsewhere herein) to achieve varying overall density and/or hardness characteristics (or in situ Young's modulus) of such particles, for example, to meet specific formation conditions.

In another embodiment, a first relatively lightweight and/or substantially neutrally buoyant core material may be coated or at least partially surrounded with at least one layer of a second material that may be selected to act to harden and/or isolate or protect the first material from adverse formation or wellbore conditions, for example so as to avoid exposure to acids or other workover/drilling fluids, to avoid saturation with liquids, provide longer fracture proppant/sand control pack life, etc. In this regard, any coating material known in the art and suitable for imparting hardness and/or suitable for at least partially protecting or isolating a first relatively lightweight and/or substantially buoyant core material as so described herein may be employed. Examples of such hardening and/or protective materials include, but are not limited to resins (e.g., urethane, phenolic, melamine formaldehyde, etc.) described for other use in other embodiments elsewhere herein. With benefit of this disclosure, suitable coating material/s may be selected by those of skill in the art to achieve or impart the desired qualities to a first relatively lightweight and/or substantially buoyant core material, considering anticipated wellbore and/or formation conditions. Methods for coating particulates (e.g., fracture proppant particles, etc.) with materials such as resin are known in the art, and such materials are available, for example, from manufacturers listed herein. With regard to coating of the disclosed lightweight and/or substantially neutrally buoyant materials, coating operations may be performed using any suitable methods known in the art. For example, low temperature curing methods may be employed if desired (e.g., using fast setting "cold set" or "cold cure" resins), where heating may be a problem, such as when coating materials which may be sensitive to heat, like ground nuts or fruit pits. Alternatively, indirect heating processes may be employed with such materials when it is necessary to heat a coating material for cure.

Examples of resins that may be employed as layers for protective and/or hardening purposes include, but are not limited to, phenol formaldehyde resins, melamine formaldehyde resins, and urethane resins, low volatile urethane resins (e.g., these and other types of resins available from BORDEN CHEMICAL INC., SANTROL, HEPWORTH of England), etc., and mixtures thereof. Specific examples of suitable resins include, but are not limited to, resins from BORDEN CHEMICAL and identified as 500-series and 700-series resins (e.g., 569C, 794C, etc.). Further specific examples of resins include, but are not limited to, "SIGMASET" series low temperature curing urethane resins from BORDEN CHEMICAL (e.g., "SIGMASET", "SIGMASET LV", "SIGMASET XL"), "ALPHASET" phenolic resin from BORDEN, "OPTI-PROP" phenolic resin from SANTROL, and "POLAR PROP" low temperature curing resin from SANTROL. Low temperature curing resins may be applied with little or no heat, which may be desirable when coating heat-sensitive materials such as wood, nut shell material, etc. Alternatively, heat cured resins may be applied and cured using heating methods that are compatible with heat sensitive materials. For example, in one embodiment, ground walnut shells may be coated with SANTROL "OPTI-PROP" resin in a single coating step using indirect heat (e.g., at temperatures of up to about 300° F., or alternatively from about 150° F. to about 200° F.). Where desired, curing characteristics (e.g., curing time, etc.) may be adjusted to fit particular layer application methods and/or final product specifications by, for example, adjusting relative amounts of resin components. Still further examples of suitable resins and coating methods include, but are not limited to, those found in European Patent Application EP 0 771 935 A1; and in U.S. Pat. Nos. 4,869,960; 4,664,819; 4,518,039; 3,929,191; 3,659,651; and 5,422,183, each of the foregoing references being incorporated herein by reference in its entirety.

With benefit of this disclosure, those of skill in the art will understand that first and one or more second materials may be selected to meet particular criteria based on the information and examples disclosed herein, as well as knowledge in the art. In this regard, one or more second material coatings or layers may be present, for example, to substantially protect the ground walnut hull first material from downhole fluids such as formation, drilling, workover fluids (e.g., salt water, acid, etc.), and/or to harden or otherwise modify the first material from closure stress or other mechanical stresses that may be encountered downhole. In this regard, thickness or amount of one or more coatings may be any amount suitable to provide a particle having an altered in situ Young's modulus and/or to provide at least partial protection, for the inner first material, from wellbore or formation conditions.

In one embodiment, a coating of one or more second materials may be from about 0.1% by weight to about 50%, alternatively from about 1% by weight to about 20% by weight, alternatively from about 10% by weight to about 20%, alternatively from about 2% to about 12% by weight of the total weight of the multi-component particle, although greater and lesser amounts are possible. In this way, a first material such as ground walnut shell particulates may be coated with, for example, from about 2% to about 12% of a suitable resin (e.g., BORDEN "SIGMASET LV" resin) by weight of total weight of each particle to form relatively lightweight and/or substantially neutrally buoyant proppant/sand control particulate. Such particles may exhibit increased strength and/or resistance to well fluids over uncoated ground walnut hulls. In one embodiment, it has been found that application of from about 8% to about 12% by weight of total particle weight of "SIGMASET LV" resin to ground walnut hull particulate material serves to permeate the material so as to substantially fill the accessible or permeable porosity of the materials such that a relatively shiny or glazed surface appearance is achieved.

In one exemplary embodiment, about 12/20 mesh ground walnut hulls from "COMPOSITION MATERIALS, INC." having an in situ Young's modulus of from about 1,000,000 psi to about 2,000,000 psi (and described elsewhere herein) may be coated with a second material, such as "SIGMASET LV" or "SIGMASET XL" resin available from BORDEN CHEMICAL (in amounts as described elsewhere herein). Such coated particles may be manufactured and/or supplied, for example, by BORDEN CHEMICAL. It will be understood that a protective resin layer may also function as a hardener to the core material, however, an additional and separate hardener material layer may also be present to impart additional hardness to the core material if so desired. In one exemplary embodiment in which such a separate hardener layer is present, ground walnut shell particulates may be first coated with from about 2% to about 10% by weight (and alternatively about 2% by weight) of total weight of a separate hardener material (e.g., BORDEN "2AC" hardener) and then coated with from about 1% to about 20% by weight (and alternatively about 4% by weight) of another resin (e.g., BORDEN "SIGMASET XL" or "SIGMASET LV" resin). In one exemplary embodiment then, the 12/20 mesh ground walnut shells described above may be coated with about 2% by weight of total weight of BORDEN "2AC" hardener and about 4% by weight of total weight of BORDEN "SIGMASET XL."

It will be understood that the coating amounts given herein are exemplary only, and may be greater or lesser, and that amounts and types of core, separate hardener material and/or other protective layer material/s may be selected with benefit of this disclosure by those of skill in the art to meet or and withstand anticipated downhole conditions of a given application using methods known in the art, such as those described herein (e.g., in Examples 1 and 2). For example, in the embodiment above, ground walnut shell particles having about 2% by weight "SIGMASET XL" may be employed for relatively lower closure stress applications (such as some sand control applications), and ground walnut shell particles having closer to about 10% by weight "SIGMASET XL" may be employed for relatively higher closure stress applications (such as a proppant or fracture pack particulate), although it will be understood that these are exemplary guidelines only.

In one embodiment, the second material coating may be present, for example, to substantially protect the ground walnut hull first material from downhole fluids such as formation, drilling, workover fluids (e.g., salt water, acid, etc.), while at the same time altering the in situ Young's modulus of the particles from a starting value of about 1,000,000 psi to about 2,000,000 psi, to an overall value of from about 2,000,000 to about 3,000,000 psi.

In another exemplary embodiment, ground walnut hulls (or another porous first material) may be partially or completely impregnated with a second material, by for example, vacuum and/or pressure impregnation, spraying with hardener, or a combination thereof. For example, material may be immersed in a second material and then exposed to pressure and/or vacuum to impregnate the material. Such methods are known in the art for impregnating porous materials, such as impregnating core samples with fluids, etc. Alternatively, application of a second material may result in at least partial impregnation, for example, it has been found that up to about 10% to about 12% by weight of total particle weight of resin (such as BORDEN "SIGMASET XL") may be applied and penetrate into the porosity of ground walnut shells. Furthermore, it will be understood that a first relatively lightweight and/or substantially buoyant material may be combined with more than one other material, e.g., using the methods and configurations described elsewhere herein for embodiments involving first and second materials.

It will be understood with benefit of the disclosure that any other material suitable for coating a substantially hard proppant or sand control particulate core and having suitable protective, hardening, and/or specific gravity-altering characteristics as defined elsewhere herein may be employed.

Although embodiments of the disclosed method employing layered multi-component particles having two components or layers have been described and illustrated above, it will be understood that other configurations of layered multi-component relatively lightweight and/or substantially neutrally buoyant particles may be employed. For example, layered particles may include a core with two or more layers of materials surrounding the core. Any combination of two or more materials mentioned elsewhere herein may be employed in multi-component particles having a core surrounded by two or more layers. In this regard, particles having two or more layers of materials may be useful for providing desirable properties.

Manufacture of the disclosed embodiments of multi-component particles may be by any suitable method known in the art. In this regard, one or more layers of coatings may be applied using any coating method known in the art to a selected embodiment of core material described elsewhere herein. Coatings may be applied directly, or where required or desirable, binder materials/compositions known to those of skill in the art may be used to enhance ease of application or to enhance integrity of an applied layer/s to a core or underlying layer of selected material.

EXAMPLES

The following examples are illustrative and should not be construed as limiting the scope of the invention or claims thereof.

Example 1

Resin-Coated Ground Walnut Shells

Conductivity tests were performed according to API RP 61 ($1^{st}$ Revision, Oct. 1, 1989) using an API conductivity cell with Ohio sandstone wafer side inserts. Each particulate material sample was loaded into the cell and closure stress applied to the particulate material using a "DAKE" hydraulic press having a "ROSEMOUNT" differential transducer (#3051C) and controlled by a "CAMILE" controller. Also employed in the testing was a "CONSTAMETRIC 3200" constant rate pump which was used to flow deionized water through each particulate sample.

The coated ground walnut particulate material employed was ground walnut hulls from "COMPOSITION MATERIALS, INC." having a size of about 12/20 mesh and having an in situ Young's modulus of from about 1,000,000 psi to about 2,000,000 psi. The ground walnut particulate material was coated with a layer of BORDEN "SIGMASET LV" low volatility resin in an amount of about 12% by weight of total particulate weight, and the particles were manufactured by "BORDEN CHEMICAL". The coated ground walnut particulate material was tested alone, with no other particulate material blended in. It will be understood with benefit of this disclosure that other particles having a similar modulus described elsewhere herein (e.g., ground or crushed nut shells, ground or crushed seeds, etc.) may also be employed in such applications as the sole proppant or sand control particulate component of a fracturing fluid, frac pack composition, or sand control blend.

Experimental parameters for the coated walnut shell conductivity evaluation are shown in Tables I–III below.

TABLE I

| Fluid | Deionized Water |
|---|---|
| Particulate (grams) | 63 |
| Top Core (cm) | 0.91 |
| Bot Core (cm) | 0.968 |
| Initial Total Width (cm) | 5.462 |
| Width Pack, initial (cm) | 1.134 |

TABLE II

| Temperature | 150 | Particulate Size | 12/20 | |
|---|---|---|---|---|
| Closure Pressure | 500–2000 psi | Concentration | 2 | lbs/ft2 |
| Fluid Pressure (psi) | 387 | Baseline | 238 | Darcies |
| | | @ | 1000 | psi |

TABLE III

| Test Data * Time (Hours) | Temp ° C. | Water Rate mls/min | Viscosity cp | DP psi | Width inches | Conductivity md-ft | Permeability darcies | Closure Stress psi |
|---|---|---|---|---|---|---|---|---|
| 0 | 68.45 | 7.89 | 0.41 | 0.00386 | 0.433 | 22,608 | 626 | 524 |
| 10 | 65.20 | 16.27 | 0.43 | 0.01195 | 0.427 | 15,756 | 442 | 456 |
| 20 | 65.19 | 7.73 | 0.43 | 0.00613 | 0.406 | 14,585 | 432 | 1001 |
| 30 | 65.15 | 7.80 | 0.43 | 0.01445 | 0.355 | 6,251 | 211 | 2029 |
| 40 | 65.21 | 7.87 | 0.43 | 0.01469 | 0.351 | 6,203 | 212 | 2019 |
| 50 | 65.21 | 7.82 | 0.43 | 0.01483 | 0.348 | 6,106 | 211 | 2021 |
| 70 | 65.22 | 7.79 | 0.43 | 0.01516 | 0.346 | 5,947 | 206 | 2021 |

* Values given represent an average of an hour's data at each given point.

As may be seen from the results of this example, a relatively lightweight particulate that is substantially neutrally buoyant in a 10 pound per gallon brine, may advantageously be employed to yield a proppant pack having relatively good conductivity. At 1,000 psi closure stress, the pack of relatively lightweight proppant material exhibited permeabilities equal to or exceeding any of the conventional proppants (sand, etc.).

Example 2

Ground Walnut Shells Coated with Various Resins

Using a procedure similar to that of Example 1, the same type of 12/20 mesh ground hull core material was tested with different types of resin layers from BORDEN. Testing was carried out for all samples at 150° F. and closure stresses ranging from 500 psi to 2000 psi. For two of samples, testing was also carried out at 200° F. and closure stress of 2200 psi. Resin type and amounts used in each sample are identified in Table IV. Results of this testing is given in Tables V and VI, and in FIGS. 2 and 3.

TABLE IV

BORDEN Resin Layers on 12/20 Mesh Ground Walnut Shell Material

| Sample Identifier | Layer Type and Amount (% by Weight of Total Weight of Particle) * |
|---|---|
| A | Inner layer of 2% by weight BORDEN "2AC" with Outer Layer of 4% by weight BORDEN "SIGMASET LV" |
| B | Layer of 6% by weight BORDEN "SIGMASET LV" resin (Coated particles having Borden identification code "66040") |
| C | Layer of 6% by weight BORDEN "SIGMASET LV" resin (Coated particles having Borden identification code "66535") |
| D | BORDEN Two Coat Resin-Inner layer of 2% by weight separate hardener material and outer layer of 3% by weight "SIGMASET LV" (Coated particles having Borden identification code "2PN3x") |
| E | Layer of 12% by weight BORDEN "SIGMASET LV" |

* In Table IV, BORDEN product identification codes 66040 and 66535 denote particles coated with "SIGMASET LV" resin having modified curing characteristics, i.e., the first digit in the code represents the % by weight of resin applied as a percentage of total particle weight (e.g., 6%), the second and third digits in the code represent weight percentage of the first resin component (e.g., 60% and 65% respectively), and the fourth and fifth digits represent weight percentage of the second resin component (e.g., 40% and 35% respectively).

TABLE V

| Closure Stress, psi | Permeability, Darcies | | | | |
|---|---|---|---|---|---|
| | Sample A | Sample B | Sample C | Sample D | Sample E |
| 500 | 453 | 205 | 383 | 429 | 432 |
| 1000 | 303 | 146 | 200 | 153 | 319 |

TABLE V-continued

| Closure Stress, psi | Permeability, Darcies | | | | |
|---|---|---|---|---|---|
| | Sample A | Sample B | Sample C | Sample D | Sample E |
| 2000 | 220 | 46 | 94 | 88 | 206 |
| | 105 | | | | 76 |

TABLE VI

| Closure Stress, psi | Cell Width, Inches | | | | |
|---|---|---|---|---|---|
| | Sample A | Sample B | Sample C | Sample D | Sample E |
| 500 | 0.43 | 0.43 | 0.41 | 0.41 | 0.43 |
| 1000 | 0.41 | 0.4 | 0.38 | 0.39 | 0.406 |
| 2000 | 0.36 | 0.345 | 0.3 | 0.35 | 0.35 |
| 2200 | 0.32 | | | | 0.299 |

Figure 2:
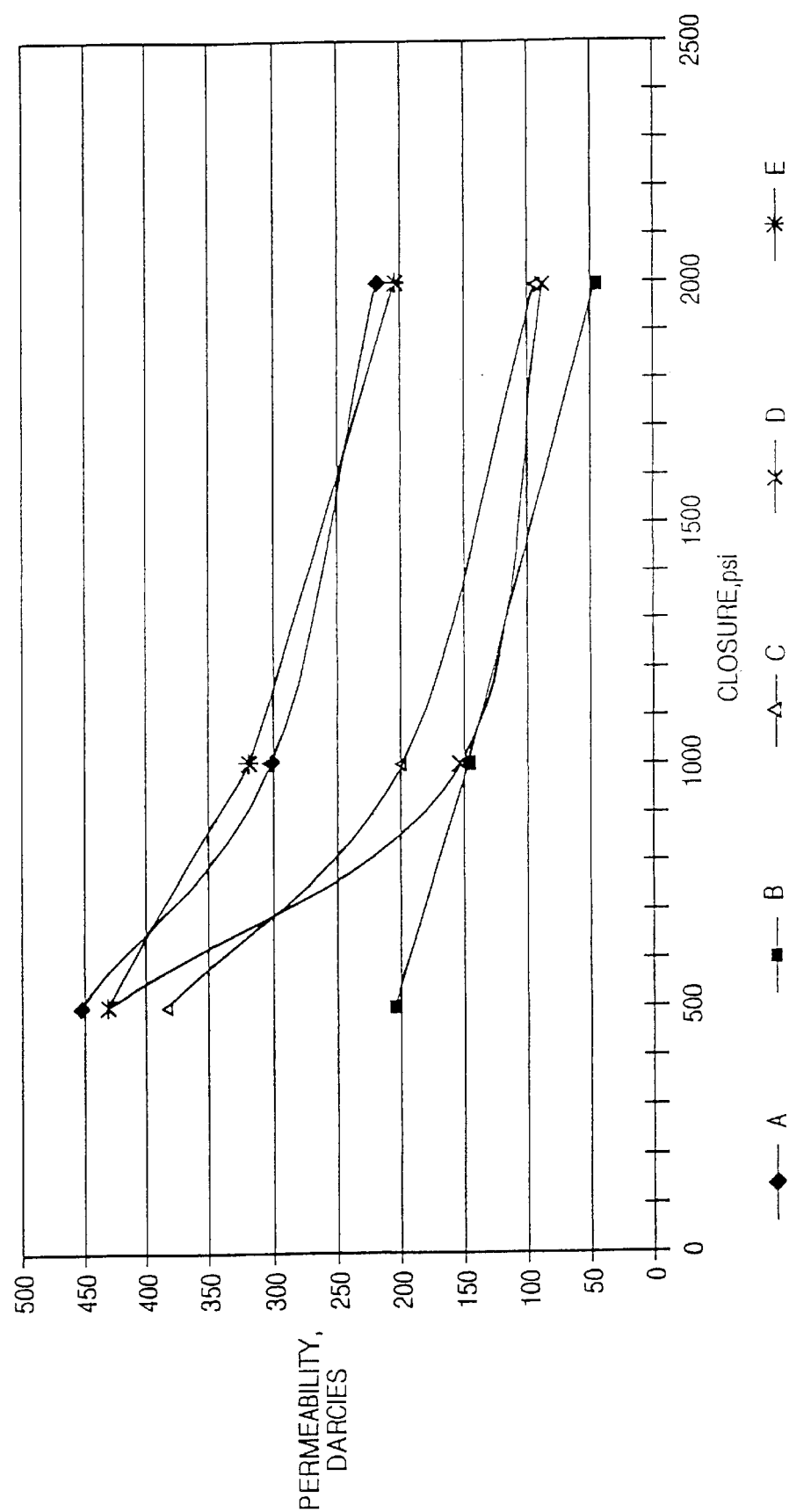
FIG. 2 shows permeability versus closure stress for particulate according to one embodiment of the disclosed method.

FIG. 2 shows the permeability of the relatively lightweight particulate core materials having the various types of resin layers of this example at 500, 1000 and 2000 psi closure stresses and 150° F.

Figure 3:
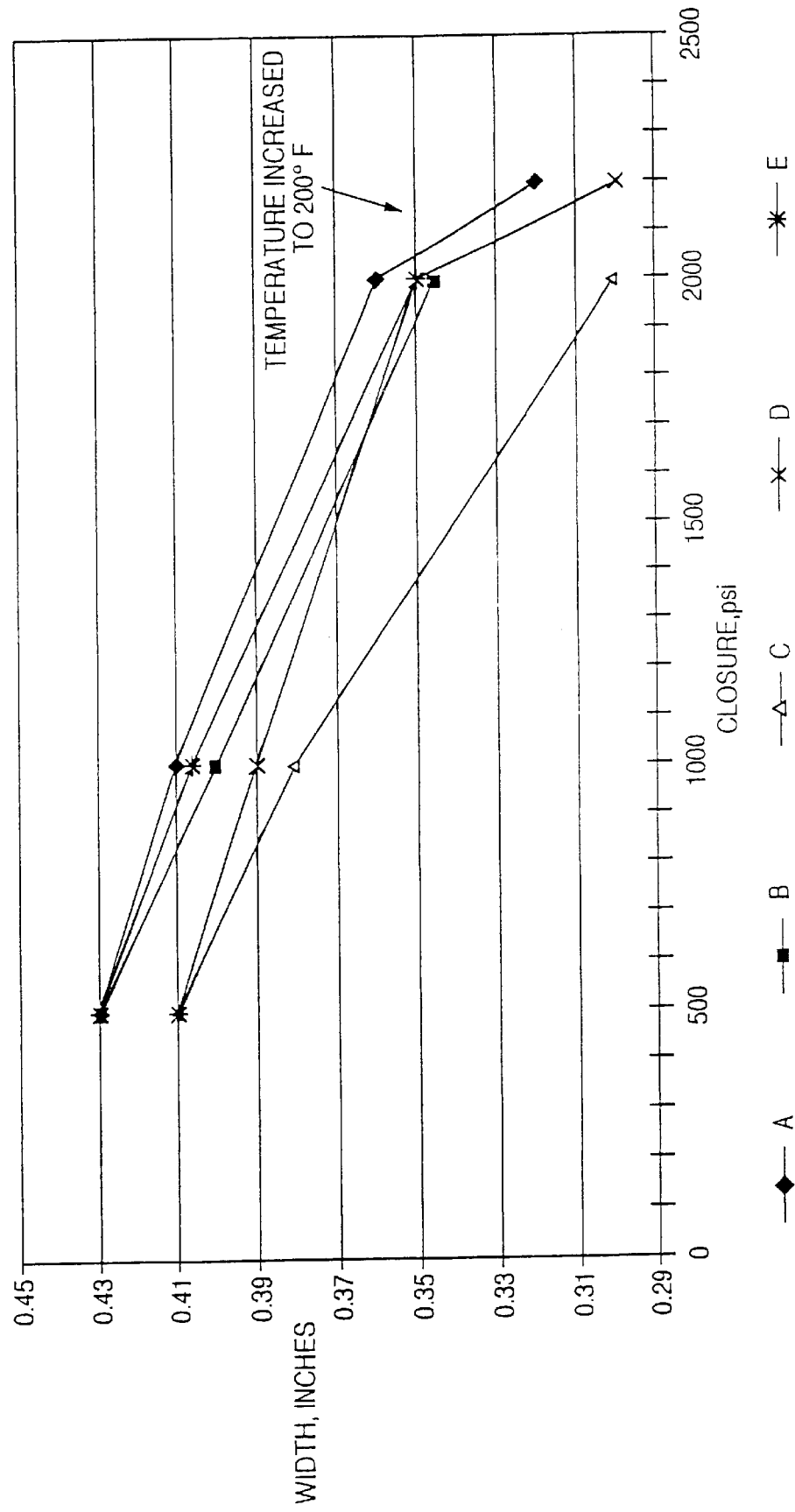
FIG. 3 shows cell width versus closure stress for particulate according to one embodiment of the disclosed method.

FIG. 3 shows pack or conductivity cell width of the relatively lightweight particulate core materials having the various types of resin layers of this example at 500, 1000 and 2000 psi closure stresses and 150° F. Also shown is cell or pack width of the relatively lightweight particulate materials Samples A and E at 2200 psi closure stress and 200° F.

The results of Examples 1 and 2 illustrate just one way that relatively lightweight particulate core materials may be evaluated with various types and/or amounts of resins to fit particular conditions, for example, anticipated wellbore or formation conditions. With benefit of this disclosure, those of skill in the art will understand that using this or other methods known in the art suitable for simulating anticipated downhole conditions, types of relatively lightweight material core materials and coatings (or combinations of two or more coatings) may be selected or tailored for use in a given desired application.

Example 3

Conductivity Tests for Variously Treated Ground Walnut Shells

Using a procedure similar to that of Example 1, conductivity tests were performed on three different samples of 12/20 mesh ground walnut shells at 150° F. and at a concentration of 1 lb/ft$^2$: Sample A (treated with inner layer of phenol formaldehyde resin and outer layer of urethane epoxy resin); Sample B (soaked for 4 hours at room temperature in FSA-1 siloxane-based compound); and Sample C (spray treated with FSA-1 in an amount of 26% by weight of the ground walnut hull material). The particles of Samples A and C were manufactured by FRITZ, while the particles of Sample B were manufactured in the laboratory. Results of this testing is shown in Table VII and FIG. 4.

TABLE VII

| Closure Stress, psi | Permeability, Darcies | | |
|---|---|---|---|
| | Sample A | Sample B | Sample C |
| 1000 | 91 | 240 | 250 |
| 2000 | 86 | 170 | 120 |
| 3000 | 30 | 100 | 80 |

Figure 4:
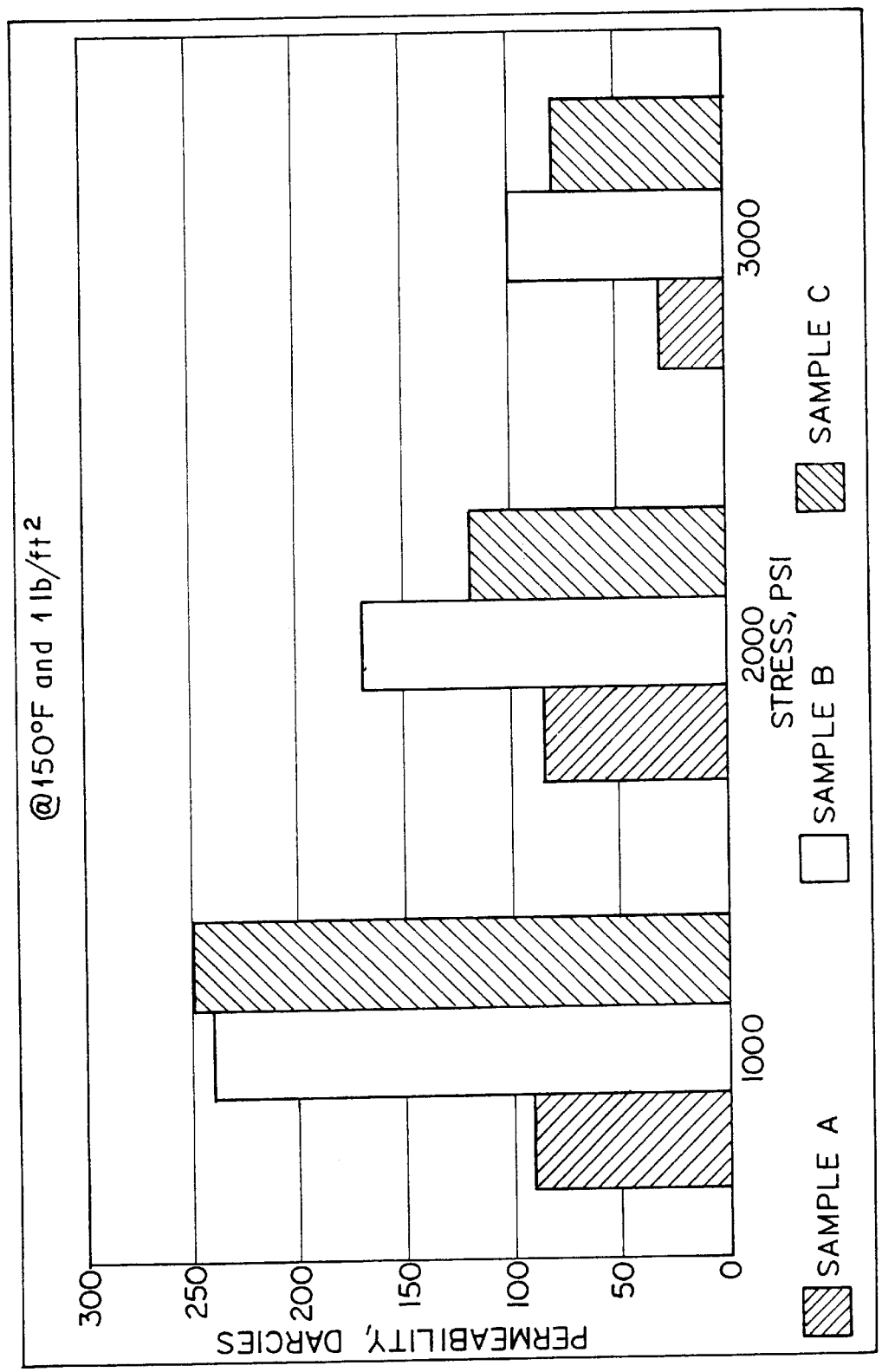
FIG. 4 shows permeability versus closure stress for particulate according to one embodiment of the disclosed method.

FIG. 4 shows the permeability of the ground walnut hull materials of the three samples of this example at 500, 1000 and 2000 psi closure stresses and 150° F.

The results of this example illustrate how ground walnut hull materials modified with silane-based modifying agent may be used to form particulate packs having good permeability at increasing closure stresses.

Example 4

Additional Conductivity Tests for Ground Walnut Shells

Using a procedure similar to that of Example 1, conductivity tests were performed on two different samples of 12/20 mesh ground walnut shells at 150° F. and at a concentration of 2 lb/ft$^2$: Sample A (treated with urethane resin) and manufactured by FRITZ; and Sample B (soaked for 4 hours at room temperature in FSA-1 siloxane-based compound). Results of this testing is shown in Tables VIII–XI.

TABLE VIII

Sample A: Resin Coated Ground Walnut Hulls

| Temperature | 150 | Particulate Size | 12/20 | |
|---|---|---|---|---|
| Closure Pressure | 3000 psi | Concentration | 2 | lbs/ft2 |
| Fluid Pressure (psi) | 200 | | | |

TABLE IX

Sample A: Resin Coated Ground Walnut Hulls

| Test Data * Time (Hours) | Temp ° C. | Water Rate mls/min | Viscosity cp | DP psi | Width inches | Conductivity md-ft | Permeability darcies | Closure Stress Psi |
|---|---|---|---|---|---|---|---|---|
| 0 | 64.47 | 8.48 | 0.44 | 0.00635 | 0.59 | 15,637 | 318 | 1094 |
| 10 | 65.00 | 8.81 | 0.43 | 0.00909 | 0.55 | 11,253 | 246 | 1105 |
| 20 | 65.00 | 8.51 | 0.43 | 0.00969 | 0.55 | 10,190 | 222 | 1083 |
| 30 | 64.99 | 8.50 | 0.43 | 0.01567 | 0.39 | 6,302 | 194 | 2059 |
| 40 | 65.00 | 8.43 | 0.43 | 0.01669 | 0.39 | 5,861 | 180 | 2036 |

TABLE IX-continued

Sample A: Resin Coated Ground Walnut Hulls

| Test Data * Time (Hours) | Temp ° C. | Water Rate mls/min | Viscosity cp | DP psi | Width inches | Conductivity md-ft | Permeability darcies | Closure Stress Psi |
|---|---|---|---|---|---|---|---|---|
| 50 | 65.01 | 8.56 | 0.43 | 0.01926 | 0.39 | 5,162 | 159 | 2711 |
| 60 | 64.99 | 8.62 | 0.43 | 0.02654 | 0.37 | 3,772 | 124 | 3021 |
| 70 | 64.99 | 8.52 | 0.43 | 0.02861 | 0.37 | 3,458 | 114 | 2992 |

* Values given represent an average of an hour's data at each given point.

TABLE X

Sample B: Ground Walnut Hulls Treated with Modifying Agent

| | | | | |
|---|---|---|---|---|
| Temperature | 150° | Particulate Size | 12/20 | |
| Closure Pressure | 3000 psi | Concentration | 2 | lbs/ft2 |
| Fluid Pressure (psi) | 450 | | | |

TABLE XI

Sample B: Ground Walnut Hulls Treated with Modifying Agent

| Test Data * Time (Hours) | Temp ° C. | Water Rate mls/min | Viscosity cp | DP psi | Width inches | Conductivity md-ft | Permeability darcies | Closure Stress psi |
|---|---|---|---|---|---|---|---|---|
| 0 | 64.46 | 8.21 | 0.44 | 0.00372 | 0.590 | 25,829 | 525 | 1412 |
| 10 | 65.00 | 8.20 | 0.43 | 0.00722 | 0.550 | 13,187 | 288 | 1405 |
| 20 | 65.00 | 8.21 | 0.43 | 0.00796 | 0.550 | 11,970 | 261 | 1413 |
| 30 | 64.99 | 8.20 | 0.43 | 0.02105 | 0.390 | 4,524 | 139 | 2379 |
| 40 | 65.00 | 8.20 | 0.43 | 0.02352 | 0.370 | 4,049 | 131 | 2379 |
| 50 | 65.01 | 9.18 | 0.43 | 0.03442 | 0.360 | 3,097 | 103 | 3039 |
| 60 | 64.98 | 8.20 | 0.43 | 0.04794 | 0.340 | 1,987 | 70 | 3074 |
| 70 | 65.00 | 8.20 | 0.43 | 0.05317 | 0.334 | 1,790 | 64 | 3043 |

* Values given represent an average of an hour's data at each given point.

The results of this example also illustrate how ground walnut hull materials modified with silane-based modifying agent may be used to form particulate packs having good permeability at increasing closure stresses.

Example 5

Stress Tests for Particulates of Various Naturally-Occurring Materials

Using equipment similar to that employed for Example 1, stress tests were performed on particulate packs formed from four different particulate packs formed from four respective samples of 12/20 mesh naturally-occurring particulate material: Sample A (ground apricot pits); Sample B (ground walnut hulls having about 2% by weight moisture content); Sample C (ground walnut hulls having about 5% by weight moisture content); and Sample D (ground olive pits). The particles of each of Samples A through D were obtained from FRITZ, and were soaked for 4 hours at room temperature in FSA-1 siloxane-based compound. Each of the particulate samples was loaded into a test cell at a concentration of 1 lbs/ft² for testing at 150° F. During the test of each particulate pack, increasing compressive stress was applied to the pack and the resulting width of the pack within the cell measured using a sensitive linear variable differential transducer.

Figure 5:
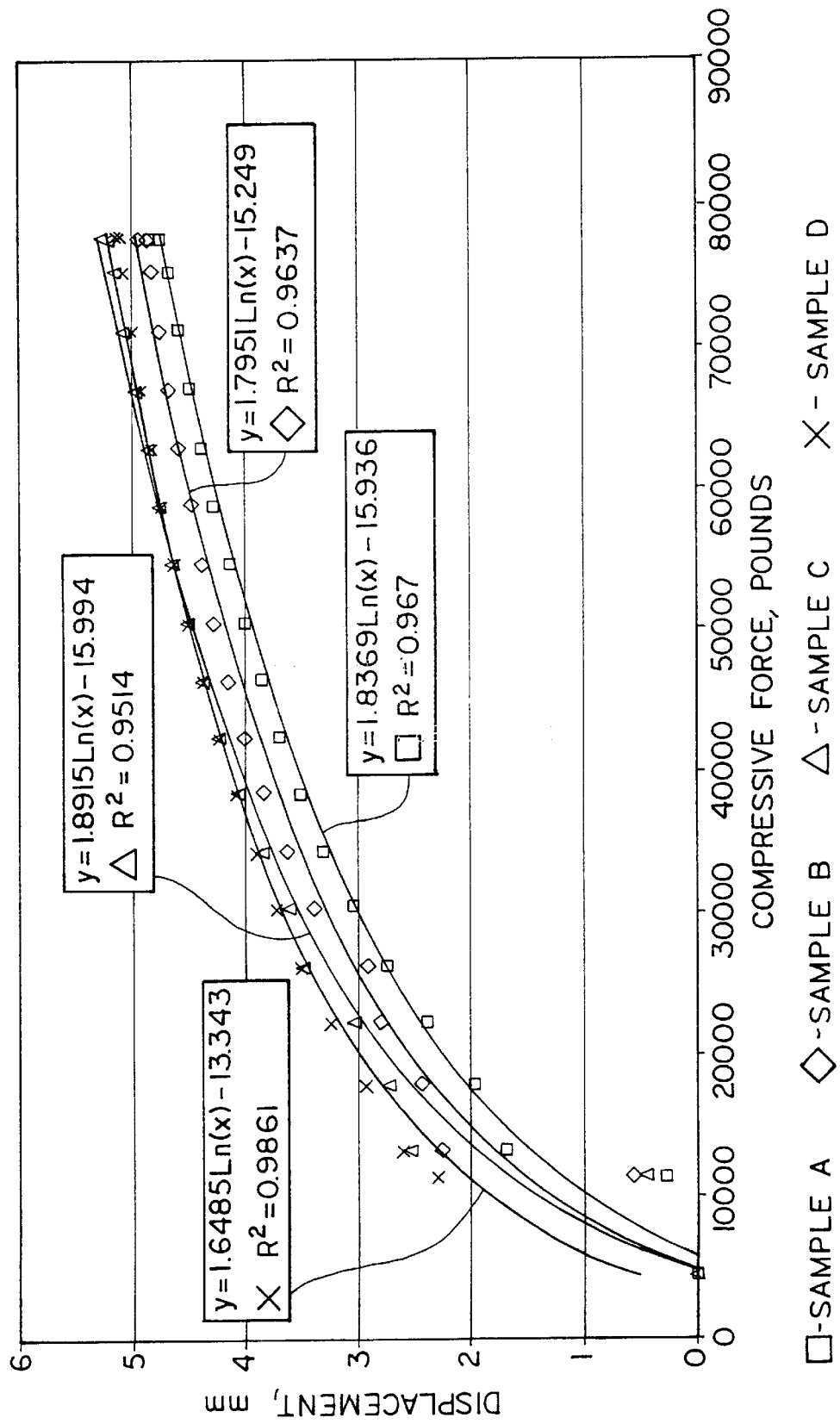
FIG. 5 shows pack width displacement versus closure stress for particulate according to one embodiment of the disclosed method.

Results of this testing is shown in FIG. 5 as a plot of pack width displacement (i.e. reduction in pack width) in milli-meters versus increasing compressive force. As may be seen in FIG. 5, the modified ground apricot pits of Sample A exhibited the least pack width reduction with increasing force, translating into most retained permeability of the four samples at a given stress level. The modified ground olive pits of Sample D showed the most pack width reduction with increasing stress, translating into least retained permeability of the four samples at a given stress level. The modified ground walnut hulls of Samples B and C exhibited pack width reduction values in-between those of Samples A and D at most stress levels. In this regard, the modified ground walnut hulls of Sample B (having a moisture content of about 2%) exhibited less pack width reduction than the modified ground walnut hulls of Sample C (having a moisture content of about 5%) at a given stress level, showing that lower moisture levels may translate into increased strength or hardness for a given naturally occurring material. For example, in one embodiment of the disclosed compositions and methods, naturally-occurring particulate material (e.g., ground walnut hull material) having a moisture content of from about 2% by weight of the material to about 5% by weight of the material may be employed.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims.

What is claimed is:

1. A method for treating a well penetrating a subterranean formation, comprising:
   introducing a particulate material into said well;
   wherein at least a portion of said particulate material comprises particles of a naturally-occurring material modified by penetration and reaction with at least one modifying agent, said modifying agent being effective to penetrate into and modify said naturally-occurring material within said particulate material by increasing the ability of said naturally-occurring material to resist deformation.

2. The method of claim 1, wherein said naturally-occurring material comprises plant-based or agricultural-based material, or a derivative thereof.

3. The method of claim 2, wherein individual particles of said modified naturally-occurring material comprise at least one of ground or crushed nut shells, ground or crushed seed shells, ground or crushed fruit pits, processed wood, or a mixture thereof.

4. The method of claim 2, wherein said modifying agent comprises at least one of a silane-based compound, siloxane-based compound, polyisocyanate-based compound, polyepoxy-based compound, or a combination thereof.

5. The method of claim 2, wherein said modifying agent comprises at least one of:

a silane-based compound having the formula:

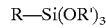

wherein R is a branched or linear aliphatic carbon chain that is saturated or unsaturated, and that has from about 1 to about 10 carbon atoms; and wherein each R' is independently branched or linear carbon chain that is saturated or unsaturated, and that has from about 1 to about 4 carbon atoms; or a siloxane-based compound having the formula:

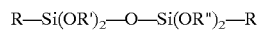

wherein R is a branched or linear aliphatic carbon chain that is saturated or unsaturated, and that has from about 1 to about 10 carbon atoms; and wherein each R' and each R" is independently a branched or linear carbon chain that may be saturated or unsaturated, and that has from about 1 to about 4 carbon atoms; or a polyisocyanate-based compound having the formula:

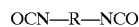

wherein R is at least one of phenyl, derivatized phenyl, an aliphatic carbon chain having from about 2 to about 10 carbon atoms, or a combination thereof.

6. The method of claim 2, wherein individual particles of said modified naturally-occurring material are introduced into said well as substantially neutrally buoyant particles in a carrier fluid.

7. The method of claim 6, wherein said method further comprises introducing said individual particles of said modified naturally-occurring material and said carrier fluid into said subterranean formation at a pressure above a fracturing pressure of said subterranean formation.

8. The method of claim 6, wherein said method further comprises introducing said individual particles of said modified naturally-occurring material and said carrier fluid into said well as part of a sand control operation.

9. The method of claim 2, wherein at least a portion of individual particles of said particulate material each comprises a core component of said modified naturally-occurring material at least partially surrounded by at least one layer of a protective or hardening coating.

10. The method of claim 2, wherein at least a portion of individual particles of said particulate material comprises particles of a naturally-occurring material that have been exposed to an enhancing agent to facilitate interaction between said modifying agent and said naturally-occurring material.

11. The method of claim 2, wherein said wellbore has an angle with respect to the vertical of between about 30 degrees and about 90 degrees.

12. The method of claim 1, wherein said particles of a naturally-occurring material are not treated with resin.

13. A method of fracturing a subterranean formation, comprising:

introducing a particulate material suspended in a carrier fluid into said subterranean formation at a pressure above a fracturing pressure of said subterranean formation;

wherein at least a portion of the individual particles of said particulate material are substantially neutrally buoyant in said carrier fluid and comprise particles of a naturally-occurring material modified by penetration and reaction with at least one modifying agent in an amount effective to modify said naturally-occurring material within said particulate material by increasing the ability of said naturally-occurring material to resist deformation;

wherein at least a portion of individual particles of said modified naturally-occurring material comprise at least one of ground or crushed nut shells, ground or crushed seed shells, ground or crushed fruit pits, processed wood, or a mixture thereof; and wherein said modifying agent comprises at least one of a silane-based compound, siloxane-based compound, polyisocyanate-based compound, or a combination thereof.

14. The method of claim 13, wherein said modifying agent comprises at least one of:

a silane-based compound having the formula:

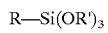

wherein R is a branched or linear aliphatic carbon chain that is saturated or unsaturated, and that has from about 1 to about 10 carbon atoms; and wherein each R' is independently branched or linear carbon chain that is saturated or unsaturated, and that has from about 1 to about 4 carbon atoms; or a siloxane-based compound having the formula:

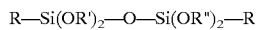

wherein R is a branched or linear carbon aliphatic chain that is saturated or unsaturated, and that has from about 1 to about 10 carbon atoms; and wherein each R' and each R" is independently a branched or linear carbon chain that may be saturated or unsaturated, and that has from about 1 to about 4 carbon atoms; or a polyisocyanate-based compound having the formula:

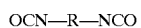

wherein R is at least one of phenyl, derivatized phenyl, or an aliphatic carbon chain having from about 2 to about 10 carbon atoms; or a combination thereof.

15. The method of claim 13, wherein said modifying agent comprises at least one of gamma-aminopropyltriethoxy silane, propyltriethoxysilane, or mixture thereof.

16. The method of claim 13, wherein at least a portion of individual particles of said modified naturally-occurring material comprise ground or crushed walnut shells, ground or crushed ivory nut shells, ground or crushed peach pits, ground or crushed apricot pits, ground or crushed olive pits, or a mixture thereof.

17. The method of claim 16, wherein a closure stress of a hydraulic fracture created during said introducing into said subterranean formation is greater than or equal to about 5000 psi.

18. The method of claim 17, wherein a temperature of said formation is from about 150° F. 250° F.

19. The method of claim 18, wherein individual particles of said modified naturally-occurring particulate material have a greater resistance to deformation when exposed to said conditions of temperature and closure stress than do unmodified particles of the same naturally-occurring material.

20. The method of claim 13, wherein at least a portion of individual particles of said particulate material each comprises a core component of said modified naturally-occurring material at least partially surrounded by at least one layer of a protective or hardening coating.

21. The method of claim 13, wherein at least a portion of individual particles of said particulate material comprises particles of a naturally-occurring material that have been exposed to an enhancing agent to facilitate interaction between said modifying agent and said naturally-occurring material.

22. The method of claim 13, wherein said carrier fluid is an ungelled aqueous fluid, or an aqueous fluid characterized as having a polymer concentration of from greater than about 0 pounds of polymer per thousand gallons of base fluid to about 10 pounds of polymer per thousand gallons of base fluid, and as having a viscosity of from about 1 to about 10 centipoises.

23. The method of claim 22, wherein said particulate material has a specific gravity of from about 1 to about 1.5, and wherein said carrier fluid has a specific gravity of between about 1 and about 1.5.

24. The method of claim 23, wherein said wellbore has an angle with respect to the vertical of between about 30 degrees and about 90 degrees.

25. A sand control method for a wellbore penetrating a subterranean formation, comprising:
    introducing into said wellbore a slurry comprising particulate material and a carrier fluid;
    placing said particulate material adjacent said subterranean formation to form a fluid-permeable pack that is capable of reducing or substantially preventing the passage of formation particles from said subterranean formation into said wellbore while at the same time allowing passage of formation fluids from said subterranean formation into said wellbore;
    wherein at least a portion of the individual particles of said particulate material are substantially neutrally buoyant in said carrier fluid and comprise particles of a naturally-occurring material modified by penetration and reaction with at least one modifying agent in an amount effective to modify said naturally-occurring material within said particulate material by increasing the ability of said naturally-occurring material to resist deformation;
    wherein at least a portion of individual particles of said modified naturally-occurring material comprise at least one of ground or crushed nut shells, ground or crushed seed shells, ground or crushed fruit pits, processed wood, or a mixture thereof; and
    wherein said modifying agent comprises at least one of a silane-based compound, siloxane-based compound, polyisocyanate-based compound, or a combination thereof.

26. The method of claim 25, wherein said modifying agent comprises at least one of:
    a silane-based compound having the formula:

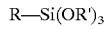

wherein R is a branched or linear aliphatic carbon chain that is saturated or unsaturated, and that has from about 1 to about 10 carbon atoms; and wherein each R' is independently branched or linear carbon chain that is saturated or unsaturated, and that has from about 1 to about 4 carbon atoms; or a siloxane-based compound having the formula:

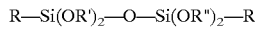

wherein R is a branched or linear aliphatic carbon chain that is saturated or unsaturated, and that has from about 1 to about 10 carbon atoms; and wherein each R' and each R" is independently a branched or linear carbon chain that may be saturated or unsaturated, and that has from about 1 to about 4 carbon atoms; or a polyisocyanate-based compound having the formula:

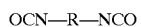

wherein R is at least one of phenyl, derivatized phenyl, or an aliphatic carbon chain having from about 2 to about 10 carbon atoms; or
    a combination thereof.

27. The method of claim 25, wherein said modifying agent comprises at least one of gamma-aminopropyltriethoxy silane, propyltriethoxysilane, or mixture thereof.

28. The method of claim 25, wherein at least a portion of individual particles of said modified naturally-occurring material comprise ground or crushed walnut shells, ground or crushed ivory nut shells, ground or crushed peach pits, ground or crushed apricot pits, ground or crushed olive pits, or a mixture thereof.

29. The method of claim 25, wherein at least a portion of individual particles of said particulate material each comprises a core component of said modified naturally-occurring material at least partially surrounded by at least one layer of a protective or hardening coating.

30. The method of claim 25, wherein at least a portion of individual particles of said particulate material comprises particles of a naturally-occurring material that have been exposed to an enhancing agent to facilitate interaction between said modifying agent and said naturally-occurring material.

31. The method of claim 25, wherein said carrier fluid is an ungelled aqueous fluid, or an aqueous fluid characterized as having a polymer concentration of from greater than about 0 pounds of polymer per thousand gallons of base fluid to about 10 pounds of polymer per thousand gallons of base fluid, and as having a viscosity of from about 1 to about 10 centipoises.

32. The method of claim 31, wherein said particulate material has a specific gravity of from about 1 to about 1.5, and wherein said carrier fluid has a specific gravity of between about 1 and about 1.5.

33. The method of claim 25, wherein said wellbore has an angle with respect to the vertical of between about 30 degrees and about 90 degrees.

34. The method of claim 25, further comprising injecting at least a portion of said slurry into said subterranean formation at a pressure exceeding a fracture pressure of said subterranean formation.

35. The method of claim 25, wherein a screen assembly having inner and outer surfaces is disposed within said wellbore, at least a portion of said outer surface of said screen assembly being disposed adjacent said subterranean formation; and wherein said method further comprises:
   placing at least a portion of said particulate blend between said outer surface of said screen assembly and said subterranean formation to form said fluid-permeable pack.

36. A particulate composition, comprising particles of a naturally-occurring material modified by penetration and reaction with at least one modifying agent, said modifying agent being effective to penetrate into and modify said naturally-occurring material within said particulate material by increasing the ability of said naturally-occurring material to resist deformation.

37. The composition of claim 36, wherein said naturally-occurring material comprises plant-based or agricultural-based material, or a derivative thereof.

38. The composition of claim 37, wherein individual particles of said modified naturally-occurring material comprise at least one of ground or crushed nut shells, ground or crushed seed shells, ground or crushed fruit pits, processed wood, or a mixture thereof.

39. The composition of claim 37, wherein said modifying agent comprises at least one of a silane-based compound, siloxane-based compound, polyisocyanate-based compound, or a combination thereof.

40. The composition of claim 39, wherein at least a portion of individual particles of said modified naturally-occurring material comprise ground or crushed walnut shells, ground or crushed ivory nut shells, ground or crushed peach pits, ground or crushed apricot pits, ground or crushed olive pits, or a mixture thereof.

41. The composition of claim 40, wherein individual particles of said modified naturally-occurring particulate material have a greater resistance to deformation when exposed to a closure stress of greater than or equal to about 5000 psi than do unmodified particles of the same naturally-occurring material.

42. The composition of claim 40, wherein individual particles of said modified naturally-occurring particulate material have a greater resistance to deformation when exposed to a closure stress of greater than or equal to about 5000 psi and a temperature of from about 150° F. to about 250° F. than do unmodified particles of the same naturally-occurring material.

43. The composition of claim 39, wherein at least a portion of individual particles of said particulate material each further comprises a core component of said modified naturally-occurring material at least partially surrounded by at least one layer of a protective or hardening coating.

44. The composition of claim 39, wherein at least a portion of individual particles of said particulate material comprises particles of a naturally-occurring material that have been exposed to an enhancing agent to facilitate interaction between said modifying agent and said naturally-occurring material.

45. The composition of claim 37, wherein said modifying agent comprises at least one of:
   a silane-based compound having the formula:

R—Si(OR')$_3$ wherein R is a branched or linear aliphatic carbon chain that is saturated or unsaturated, and that has from about 1 to about 10 carbon atoms; and wherein each R' is independently branched or linear carbon chain that is saturated or unsaturated, and that has from about 1 to about 4 carbon atoms; or a siloxane-based compound having the formula:

R—Si(OR')$_2$—O—Si(OR")$_2$—R wherein R is a branched or linear carbon aliphatic chain that is saturated or unsaturated, and that has from about 1 to about 10 carbon atoms; and wherein each R' and each R" is independently a branched or linear carbon chain that may be saturated or unsaturated, and that has from about 1 to about 4 carbon atoms; or a polyisocyanate-based compound having the formula:

OCN—R—NCO wherein R is at least one of phenyl, derivatized phenyl, or an aliphatic carbon chain having from about 2 to about 10 carbon atoms; or
   a combination thereof.

46. A method of modifying particles of a naturally-occurring material, comprising:
   penetrating and reacting particles of a naturally-occurring material with an effective amount of at least one modifying agent to modify said naturally-occurring material within said particulate material by increasing the ability of said naturally-occurring material to resist deformation.

47. The method of claim 46, wherein said naturally-occurring material comprises plant-based or agricultural-based material, or a derivative thereof.

48. The method of claim 47, wherein individual particles of said modified naturally-occurring material comprise at least one of ground or crushed nut shells, ground or crushed seed shells, ground or crushed fruit pits, processed wood, or a mixture thereof.

49. The method of claim 48, wherein said modifying agent comprises at least one of a silane-based compound, siloxane-based compound, polyisocyanate-based compound, or a combination thereof.

50. The method of claim 49, wherein said method further comprises exposing said particles of said naturally-occurring material to an effective amount of an enhancing agent to facilitate interaction between said modifying agent and said naturally-occurring material.

51. The method of claim 49 wherein said method further comprises applying at least one layer of a protective or hardening coating to said particles of modified naturally-occurring material.

52. The method of claim 47, wherein said modifying agent comprises at least one of:
   a silane-based compound having the formula:

R—Si(OR')$_3$ wherein R is a branched or linear aliphatic carbon chain that is saturated or unsaturated, and that has from about 1 to about 10 carbon atoms; and wherein each R' is independently branched or linear carbon chain that is saturated or unsaturated, and that has from about 1 to about 4 carbon atoms; or
   a siloxane-based compound having the formula:

R—Si(OR')$_2$—O—Si(OR")$_2$—R wherein R is a branched or linear carbon aliphatic chain that is saturated or unsaturated, and that has from about 1 to about 10 carbon atoms; and wherein each R' and each R" is independently a branched or linear carbon chain that may be saturated or unsaturated, and that has from about 1 to about 4 carbon atoms; or a polyisocyanate-based compound having the formula:

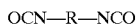

OCN—R—NCO wherein R is at least one of phenyl, derivatized phenyl, or an aliphatic carbon chain having from about 2 to about 10 carbon atoms; or a combination thereof.

53. A particulate material, comprising particles of modified naturally-occurring material made by the method of claim 46.

54. A method for treating a well penetrating a subterranean formation, comprising:

introducing a particulate material into said well;

wherein at least a portion of said particulate material comprises particles of a naturally-occurring material modified by exposure to at least one modifying agent, said modifying agent being effective to modify said naturally-occurring material by increasing the ability of said naturally-occurring material to resist deformation;

wherein said modifying agent comprises at least one of a siloxane-based compound, polyisocyanate-based compound, polyepoxy-based compound, or a combination thereof.

55. The method of claim 54, wherein said method further comprises introducing said individual particles of said modified naturally-occurring material into said subterranean formation at a pressure above a fracturing pressure of said subterranean formation.

56. The method of claim 54, wherein said method further comprises introducing said individual particles of said modified naturally-occurring material into said well as part of a sand control operation.

57. A method for treating a well penetrating a subterranean formation, comprising:

introducing a particulate material into said well;

wherein at least a portion of said particulate material comprises particles of a naturally-occurring material modified by exposure to at least one modifying agent, said modifying agent being effective to modify said naturally-occurring material by increasing the ability of said naturally-occurring material to resist deformation; wherein said naturally-occurring material comprises plant-based or agricultural-based material, or a derivative thereof; and wherein said modifying agent comprises at least one of:

a silane-based compound having the formula:

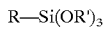

R—Si(OR')₃ wherein R is a branched or linear aliphatic carbon chain that is saturated or unsaturated, and that has from about 1 to about 10 carbon atoms; and wherein each R' is independently branched or linear carbon chain that is saturated or unsaturated, and that has from about 1 to about 4 carbon atoms; or a siloxane-based compound having the formula:

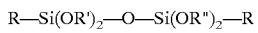

R—Si(OR')₂—O—Si(OR")₂—R wherein R is a branched or linear aliphatic carbon chain that is saturated or unsaturated, and that has from about 1 to about 10 carbon atoms; and wherein each R' and each R" is independently a branched or linear carbon chain that may be saturated or unsaturated, and that has from about 1 to about 4 carbon atoms; or a polyisocyanate-based compound having the formula:

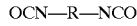

OCN—R—NCO wherein R is at least one of phenyl, derivatized phenyl, an aliphatic carbon chain having from about 2 to about 10 carbon atoms, or a combination thereof.

58. A method of fracturing a subterranean formation, comprising:

introducing a particulate material suspended in a carrier fluid into said subterranean formation at a pressure above a fracturing pressure of said subterranean formation;

wherein at least a portion of the individual particles of said particulate material are substantially neutrally buoyant in said carrier fluid and comprise particles of a naturally-occurring material modified by exposure to at least one modifying agent in an amount effective to modify said naturally-occurring material;

wherein at least a portion of individual particles of said modified naturally-occurring material comprise at least one of ground or crushed nut shells, ground or crushed seed shells, ground or crushed fruit pits, processed wood, or a mixture thereof; and wherein said modifying agent comprises at least one of:

a silane-based compound having the formula:

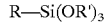

R—Si(OR')₃ wherein R is a branched or linear aliphatic carbon chain that is saturated or unsaturated, and that has from about 1 to about 10 carbon atoms; and wherein each R' is independently branched or linear carbon chain that is saturated or unsaturated, and that has from about 1 to about 4 carbon atoms; or a siloxane-based compound having the formula:

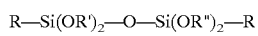

R—Si(OR')₂—O—Si(OR")₂—R wherein R is a branched or linear carbon aliphatic chain that is saturated or unsaturated, and that has from about 1 to about 10 carbon atoms; and wherein each R' and each R" is independently a branched or linear carbon chain that may be saturated or unsaturated, and that has from about 1 to about 4 carbon atoms; or a polyisocyanate-based compound having the formula:

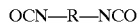

OCN—R—NCO wherein R is at least one of phenyl, derivatized phenyl, or an aliphatic carbon chain having from about 2 to about 10 carbon atoms; or a combination thereof.

59. A method of fracturing a subterranean formation, comprising:

introducing a particulate material suspended in a carrier fluid into said subterranean formation at a pressure above a fracturing pressure of said subterranean formation;

wherein at least a portion of the individual particles of said particulate material are substantially neutrally buoyant in said carrier fluid and comprise particles of a naturally-occurring material modified by exposure to at least one modifying agent in an amount effective to modify said naturally-occurring material;

wherein at least a portion of individual particles of said modified naturally-occurring material comprise at least one of ground or crushed nut shells, ground or crushed seed shells, ground or crushed fruit pits, processed wood, or a mixture thereof wherein said modifying agent comprises at least one of a silane-based compound, siloxane-based compound, polyisocyanate-based compound, or a combination thereof: and wherein said carrier fluid is an ungelled aqueous fluid, or an aqueous fluid characterized as having a polymer concentration of from greater than about 0 pounds of polymer per thousand gallons of base fluid to about 10 pounds of polymer per thousand gallons of base fluid, and as having a viscosity of from about 1 to about 10 centipoises.

60. The method of claim 59, wherein said particulate material has a specific gravity of from about 1 to about 1.5, and wherein said carrier fluid has a specific gravity of between about 1 and about 1.5.

61. The method of claim 60, wherein said wellbore has an angle with respect to the vertical of between about 30 degrees and about 90 degrees.

62. A sand control method for a wellbore penetrating a subterranean formation, comprising:

introducing into said wellbore a slurry comprising particulate material and a carrier fluid;

placing said particulate material adjacent said subterranean formation to form a fluid-permeable pack that is capable of reducing or substantially preventing the passage of formation particles from said subterranean formation into said wellbore while at the same time allowing passage of formation fluids from said subterranean formation into said wellbore;

wherein at least a portion of the individual particles of said particulate material are substantially neutrally buoyant in said carrier fluid and comprise particles of a naturally-occurring material modified by exposure to at least one modifying agent in an amount effective to modify said naturally-occurring material;

wherein at least a portion of individual particles of said modified naturally-occurring material comprise at least one of ground or crushed nut shells, ground or crushed seed shells, ground or crushed fruit pits, processed wood, or a mixture thereof; and wherein said modifying agent comprises at least one of:
a silane-based compound having the formula:

R—Si(OR')$_3$ wherein R is a branched or linear aliphatic carbon chain that is saturated or unsaturated, and that has from about 1 to about 10 carbon atoms; and wherein each R' is independently branched or linear carbon chain that is saturated or unsaturated, and that has from about 1 to about 4 carbon atoms; or a siloxane-based compound having the formula:

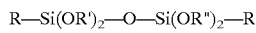

R—Si(OR')$_2$—O—Si(OR")$_2$—R wherein R is a branched or linear aliphatic carbon chain that is saturated or unsaturated, and that has from about 1 to about 10 carbon atoms; and wherein each R' and each R" is independently a branched or linear carbon chain that may be saturated or unsaturated, and that has from about 1 to about 4 carbon atoms; or a polyisocyanate-based compound having the formula:

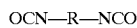

OCN—R—NCO wherein R is at least one of phenyl, derivatized phenyl, or an aliphatic carbon chain having from about 2 to about 10 carbon atoms; or a combination thereof.

63. A sand control method for a wellbore penetrating a subterranean formation, comprising:

introducing into said wellbore a slurry comprising particulate material and a carrier fluid;

placing said particulate material adjacent said subterranean formation to form a fluid-permeable pack that is capable of reducing or substantially preventing the passage of formation particles from said subterranean formation into said wellbore while at the same time allowing passage of formation fluids from said subterranean formation into said wellbore;

wherein at least a portion of the individual particles of said particulate material are substantially neutrally buoyant in said carrier fluid and comprise particles of a naturally-occurring material modified by exposure to at least one modifying agent in an amount effective to modify said naturally-occurring material;

wherein at least a portion of individual particles of said modified naturally-occurring material comprise at least one of ground or crushed nut shells, ground or crushed seed shells, ground or crushed fruit pits, processed wood, or a mixture thereof;

wherein said modifying agent comprises at least one of a silane-based compound, siloxane-based compound, polyisocyanate-based compound, or a combination thereof; and wherein said carrier fluid is an ungelled aqueous fluid, or an aqueous fluid characterized as having a polymer concentration of from greater than about 0 pounds of polymer per thousand gallons of base fluid to about 10 pounds of polymer per thousand gallons of base fluid, and as having a viscosity of from about 1 to about 10 centipoises.

64. The method of claim 63, wherein said particulate material has a specific gravity of from about 1 to about 1.5, and wherein said carrier fluid has a specific gravity of between about 1 and about 1.5.

* * * * *

UNITED STATES PATENT AND TRADEMARK OFFICE
CERTIFICATE OF CORRECTION

PATENT NO. : 6,772,838 B2
DATED : August 10, 2004
INVENTOR(S) : Jeffrey Dawson et al.

It is certified that error appears in the above-identified patent and that said Letters Patent is hereby corrected as shown below:

Column 33,
Line 12, please delete the "." after "150ºF" please insert -- to about -- after "150ºF".

Signed and Sealed this

Fifth Day of October, 2004

JON W. DUDAS
*Director of the United States Patent and Trademark Office*